United States Patent
Teller et al.

(10) Patent No.: US 9,848,335 B1
(45) Date of Patent: *Dec. 19, 2017

(54) VALUATION OF AND MARKETPLACE FOR INTER-NETWORK LINKS BETWEEN A HIGH-ALTITUDE NETWORK AND TERRESTRIAL NETWORK

(71) Applicant: X Development LLC, Mountain View, CA (US)

(72) Inventors: Eric Teller, Palo Alto, CA (US); Richard Wayne DeVaul, Mountain View, CA (US); Clifford L. Biffle, Berkeley, CA (US); Joshua Weaver, San Jose, CA (US); Anton Valdemar Staaf, San Jose, CA (US)

(73) Assignee: X Development LLC, Mountain View, CA (US)

(*) Notice: Subject to any disclaimer, the term of this patent is extended or adjusted under 35 U.S.C. 154(b) by 40 days.

This patent is subject to a terminal disclaimer.

(21) Appl. No.: 15/050,071

(22) Filed: Feb. 22, 2016

Related U.S. Application Data

(63) Continuation of application No. 14/609,813, filed on Jan. 30, 2015, now Pat. No. 9,300,481, which is a
(Continued)

(51) Int. Cl.
*H04W 16/14* (2009.01)
*H04W 4/24* (2009.01)
*H04B 7/185* (2006.01)

(52) U.S. Cl.
CPC ........ *H04W 16/14* (2013.01); *H04B 7/18504* (2013.01); *H04W 4/24* (2013.01)

(58) Field of Classification Search
CPC .. H04L 12/1428; H04W 4/24; H04W 84/005; H04W 16/14; H04B 7/18504
See application file for complete search history.

(56) References Cited

U.S. PATENT DOCUMENTS 5,905,975 A * 5/1999 Ausubel .......................... 705/37
7,917,135 B2 3/2011 Karabinis
(Continued)

OTHER PUBLICATIONS

Mohammed. Hasanain All, et al., Performance Evaluation of a WiMAX Enabled HAPs-Satellite Hybrid System, School of Engineering, Design and Technology, University of Bradford, 2009, United Kingdom.
(Continued)

*Primary Examiner* — Jianye Wu
(74) *Attorney, Agent, or Firm* — McDonnell Boehnen Hulbert & Berghoff LLP

(57) ABSTRACT

Embodiments relate to a marketplace for inter-network links between a high-altitude network and a terrestrial data network. An example method may involve a computer-based purchasing agent: (i) determining a demand for inter-network bandwidth between a high-altitude network and a terrestrial data network, (ii) determining one or more offers to provide an inter-network link, wherein the inter-network link provides inter-network bandwidth between the high-altitude network and the terrestrial data network, and wherein each offer is associated with a corresponding client device, (iii) based at least in part on a comparison of: (a) the demand for inter-network bandwidth and (b) the one or more offers to provide an inter-network link, selecting one or more of the offers to provide an inter-network link, and (iv) initiating a process to establish an inter-network link at each client device that corresponds to one of the one or more selected offers.

20 Claims, 13 Drawing Sheets

Related U.S. Application Data continuation of application No. 13/673,700, filed on Nov. 9, 2012, now Pat. No. 8,971,274.

(56) References Cited

U.S. PATENT DOCUMENTS

| | | |
|---|---|---|
| 8,078,162 B2 | 12/2011 | Deaton et al. |
| 8,116,763 B1 | 2/2012 | Olsen |
| 2002/0072361 A1* | 6/2002 | Knoblach et al. ............ 455/431 |
| 2003/0135784 A1* | 7/2003 | Yamaguchi et al. ............ 714/18 |
| 2004/0198346 A1 | 10/2004 | Swensen et al. |
| 2007/0112705 A1 | 5/2007 | Mardirossian |
| 2009/0005026 A1 | 1/2009 | Lunsford et al. |
| 2009/0028110 A1 | 1/2009 | Chen et al. |
| 2009/0132383 A1 | 5/2009 | Piepenbrink et al. |
| 2010/0216423 A1 | 8/2010 | Fish et al. |
| 2011/0183714 A1 | 7/2011 | McMahan et al. |

OTHER PUBLICATIONS

Grace, David et al., Broadband Communications via High Altitude Platforms, Dec. 2010, p. 1-48, John Wiley & Sons, Ltd.

Hironori Oka, et al., "Experimental Evaluation of Skymesh Using Terrestrial Nodes," 16th Asia-Pacific Conference on Communications (APCC), 2010, pp. 52-57.

* cited by examiner

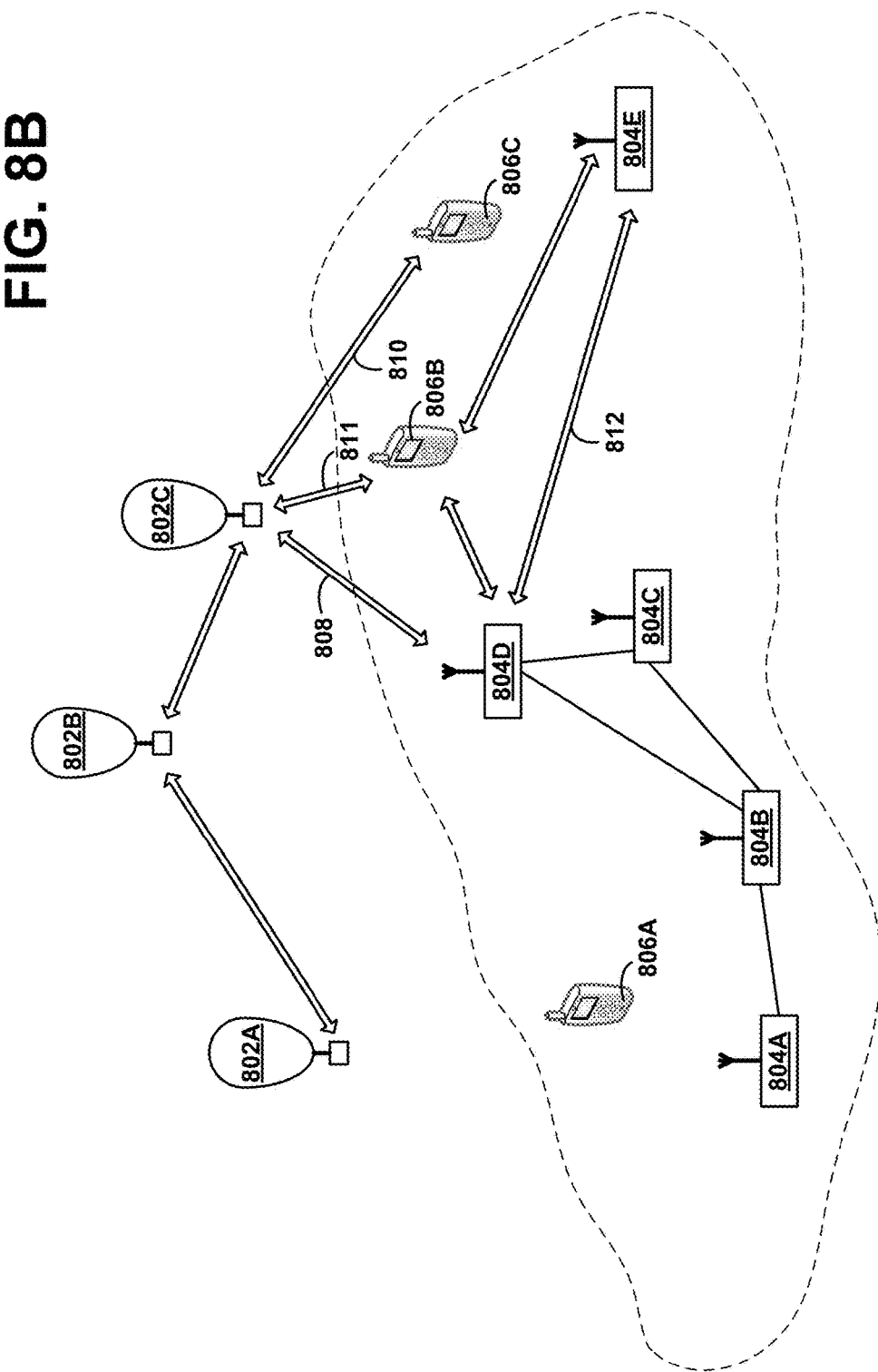

VALUATION OF AND MARKETPLACE FOR INTER-NETWORK LINKS BETWEEN A HIGH-ALTITUDE NETWORK AND TERRESTRIAL NETWORK

CROSS REFERENCE TO RELATED APPLICATIONS

This application claims priority to U.S. patent application Ser. No. 14/609,813, filed on Jan. 30, 2015, which claims priority to U.S. patent application Ser. No. 13/673,700, filed on Nov. 9, 2012, entitled "Valuation of and Marketplace for Inter-Network Links Between Balloon Network and Terrestrial Network", both of which are incorporated by reference herein in their entirety for all purposes.

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

SUMMARY

In one aspect, a computer-implemented method involves a computing device: (i) determining a demand for inter-network bandwidth between a balloon network and a terrestrial data network; (ii) determining one or more offers to provide an inter-network link, wherein the inter-network link provides inter-network bandwidth between the balloon network and the terrestrial data network, and wherein each offer is associated with a corresponding client device; (iii) based at least in part on a comparison of: (a) the demand for inter-network bandwidth and (b) the one or more offers to provide an inter-network link, selecting one or more of the offers to provide an inter-network link; and (iv) initiating a process to establish an inter-network link at each client device that corresponds to one of the one or more selected offers.

In another aspect, a computing system may include a non-transitory computer readable medium and program instructions stored on the non-transitory computer readable medium. The program instructions are executable by at least one processor to cause the client device to: (i) determine a demand for inter-network bandwidth between a balloon network and a terrestrial data network; (ii) determine one or more offers to provide an inter-network link, wherein the inter-network link provides inter-network bandwidth between the balloon network and the terrestrial data network, and wherein each offer is associated with a corresponding client device; (iii) based at least in part on a comparison of: (a) the demand for inter-network bandwidth and (b) the one or more offers to provide an inter-network link, select one or more of the offers to provide an inter-network link; and (iv) initiate a process to establish an inter-network link at each client device that corresponds to one of the one or more selected offers.

In a further aspect, a non-transitory computer readable medium has stored therein instructions that are executable by a client computing device to cause the client computing device to perform functions including: (i) determining a demand for inter-network bandwidth between a balloon network and a terrestrial data network; (ii) determining one or more offers to provide an inter-network link, wherein the inter-network link provides inter-network bandwidth between the balloon network and the terrestrial data network, and wherein each offer is associated with a corresponding client device; (iii) based at least in part on a comparison of: (a) the demand for inter-network bandwidth and (b) the one or more offers to provide an inter-network link, selecting one or more of the offers to provide an inter-network link; and (iv) initiating a process to establish an inter-network link at each client device that corresponds to one of the one or more selected offers.

In yet another aspect, a computer-implemented method involves: (i) determining, based at least in part on a measure of bandwidth utilization by a client device, an amount of available bandwidth that the client device can provide for an inter-network link between a balloon network and a terrestrial data network; (ii) determining offer pricing information for the available bandwidth; and (iii) sending an offer message that indicates an offer to provide an inter-network link between the balloon network and the terrestrial data network, wherein the offer message comprises: (a) an indication of the amount of available bandwidth and (b) the pricing information for the available bandwidth.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIGS. 8A and 8B are simplified illustrations of scenarios in which example methods may be implemented.

DETAILED DESCRIPTION

Figure 1:
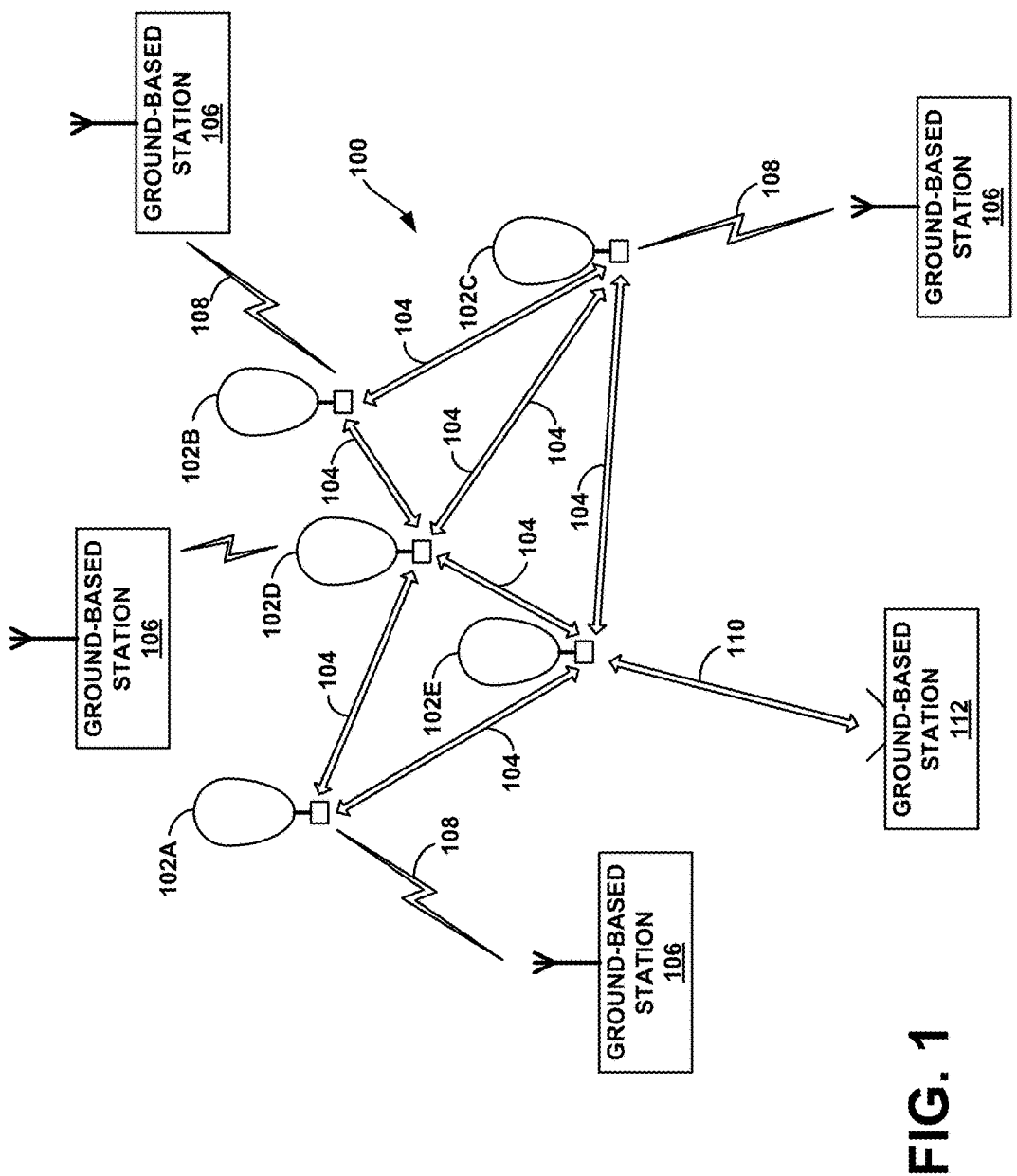
FIG. 1 is a simplified block diagram illustrating a balloon network, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

I. Overview

Example embodiments help to provide a data network that includes a plurality of balloons; for example, a mesh network formed by high-altitude balloons deployed in the stratosphere. Since winds in the stratosphere may affect the locations of the balloons in a differential manner, each balloon in an example network may be configured to change its horizontal position by adjusting its vertical position (i.e., altitude). For instance, by adjusting its altitude, a balloon may be able find winds that will carry it horizontally (e.g., latitudinally and/or longitudinally) to a desired horizontal location.

Further, in an example balloon network, the balloons may communicate with one another using free-space optical communications. For example, balloon-to-balloon free-space optical links may be implemented using lasers. As another example, balloons may be configured for optical communications using ultra-bright LEDs (which are also referred to as "high-power" or "high-output" LEDs). In addition, the balloons may communicate with ground-based station(s) using radio-frequency (RF) communications.

Operating a wireless balloon-to-ground link between a high-altitude balloon and a ground-based terrestrial network may be expensive, and can result in bottlenecks. Accordingly, balloons in a high-altitude balloon network may communicate with individual wireless client devices (such as cell phones) on the ground using, for example, a long-term evolution (LTE) protocol. If such wireless devices are in range of, for example, WiFi access points, then the client devices may operate as inter-network links, which relay communications between the balloon network and a terrestrial data network such as the Internet via the WiFi network. Further, to encourage users of such client devices to allow their devices to be utilized as inter-network links between the balloon network and terrestrial data networks, the operator of the balloon network may pay wireless device users for transferring data to and from the balloon network.

Various types of incentives may be provided in exchange for a client device's operation as an inter-network link between a balloon network and a terrestrial data network. For instance, the amount of a credit may be based on an amount of data that is transmitted via the inter-network link that a client device provides between a balloon network and a terrestrial data network and/or may be based on an amount of time for which a client device allows its resources to be utilized for an inter-network link between a balloon network and a terrestrial data network. Further, the credit may be a monetary amount or may be non-monetary. Other types of credits in exchange for allowing a client device to be used for an inter-network link are also possible.

It may be difficult for service providers to assess when and where such inter-network links are needed to meet the demand for bandwidth. Further, when a need for inter-network bandwidth is identified, it may be difficult for service providers to locate client devices to meet the need, and to negotiate inter-network links with individual client devices. Accordingly, example embodiments may help to dynamically and intelligently determine when and/or how to request that users offer their devices for inter-network links, and/or how much to offer to pay for such inter-network links.

For instance, an example embodiment may help to provide a marketplace and/or clearinghouse system to facilitate transactions for inter-network links. In particular, embodiments may involve a marketplace where a computer-based link-purchasing agent can access offers for inter-network bandwidth from client devices. Further, computer-based selling agents may have access to the marketplace in order to offer bandwidth for inter-network links on behalf of client devices. As such, the marketplace may facilitate transactions for inter-network bandwidth between purchasing agents and selling agents. In some embodiments, it may additionally or alternatively be possible for client devices to access such a marketplace directly (without using selling agents).

To do determine when and how to purchase inter-network bandwidth, a purchasing agent may evaluate current network conditions in the balloon network and between the balloon network and a terrestrial network, and determine a demand for inter-network bandwidth. The purchasing agent may then determine a price or prices that a service provider (or another person or entity) is willing to pay for inter-network bandwidth in the current network conditions. For instance, a purchasing agent could evaluate and quantify the change (e.g., decrease) in latency for network traffic and/or the change in capacity that is expected to result if a client device dedicates a certain amount of bandwidth to an inter-network link. When determining a value to offer for inter-network bandwidth, the purchasing agent may then take into account an expected need for bandwidth between the balloon network and the terrestrial network at a particular location.

In a further aspect, the purchasing agent could consider buyer-side factors such as the number of client devices that are available to serve as an inter-network link in a particular location and/or a client device's usage of its bandwidth for its own communications (e.g., the value may be adjusted based on the assumption that a client device will value bandwidth it is currently using for its own communications more than excess bandwidth that is not in use).

In another aspect, users of client devices may create computer-based selling agents that value and offer bandwidth from the client devices' network connections for inter-network links. The pricing that is offered may be based on factors such as a client device's historical, current, and/or expected usage of its bandwidth for its own communications, among other possible factors.

Note that a "user" may take many forms, such as a person, a group of persons, an entity such as a corporation or an ISP, or a group of entities, among other possibilities. Accordingly, a "user-account" may be created for any type of user.

II. Example Balloon Networks

In some embodiments, a high-altitude-balloon network may be homogenous. That is, the balloons in a high-altitude-balloon network could be substantially similar to each other in one or more ways. More specifically, in a homogenous high-altitude-balloon network, each balloon is configured to communicate with nearby balloons via free-space optical links. Further, some or all of the balloons in such a network, may also be configured communicate with ground-based station(s) using RF communications. (Note that in some embodiments, the balloons may be homogenous in so far as each balloon is configured for free-space optical communication with other balloons, but heterogeneous with regard to RF communications with ground-based stations.)

In other embodiments, a high-altitude-balloon network may be heterogeneous, and thus may include two or more different types of balloons. For example, some balloons may be configured as super-nodes, while other balloons may be configured as sub-nodes. Some balloons may be configured to function as both a super-node and a sub-node. Such balloons may function as either a super-node or a sub-node at a particular time, or, alternatively, act as both simultaneously depending on the context. For instance, an example balloon could aggregate search requests of a first type to transmit to a ground-based station. The example balloon could also send search requests of a second type to another balloon, which could act as a super-node in that context.

In such a configuration, the super-node balloons may be configured to communicate with nearby super-node balloons via free-space optical links. However, the sub-node balloons may not be configured for free-space optical communication, and may instead be configured for some other type of communication, such as RF communications. In that case, a super-node may be further configured to communicate with sub-nodes using RF communications. Thus, the sub-nodes may relay communications between the super-nodes and one or more ground-based stations using RF communications. In this way, the super-nodes may collectively function as backhaul for the balloon network, while the sub-nodes function to relay communications from the super-nodes to ground-based stations. Other differences could be present between balloons in a heterogeneous balloon network.

FIG. 1 is a simplified block diagram illustrating a balloon network 100, according to an example embodiment. As shown, balloon network 100 includes balloons 102A to 102F, which are configured to communicate with one another via free-space optical links 104. Balloons 102A to 102F could additionally or alternatively be configured to communicate with one another via RF links 114. Balloons 102A to 102F may collectively function as a mesh network for packet-data communications. Further, balloons 102A to 102F may be configured for RF communications with ground-based stations 106 and 112 via RF links 108. In another example embodiment, balloons 102A to 102F could be configured to communicate via optical link 110 with ground-based station 112.

In an example embodiment, balloons 102A to 102F are high-altitude balloons, which are deployed in the stratosphere. At moderate latitudes, the stratosphere includes altitudes between approximately 10 kilometers (km) and 50 km altitude above the surface. At the poles, the stratosphere starts at an altitude of approximately 8 km. In an example embodiment, high-altitude balloons may be generally configured to operate in an altitude range within the stratosphere that has lower winds (e.g., between 5 and 20 miles per hour (mph)).

More specifically, in a high-altitude-balloon network, balloons 102A to 102F may generally be configured to operate at altitudes between 17 km and 25 km (although other altitudes are possible). This altitude range may be advantageous for several reasons. In particular, this layer of the stratosphere generally has mild wind and turbulence (e.g., winds between 5 and 20 miles per hour (mph)).

Further, while the winds between 17 km and 25 km may vary with latitude and by season, the variations can be modelled in a reasonably accurate manner. Additionally, altitudes above 17 km are typically above the maximum flight level designated for commercial air traffic. Therefore, interference with commercial flights is not a concern when balloons are deployed between 17 km and 25 km.

To transmit data to another balloon, a given balloon 102A to 102F may be configured to transmit an optical signal via an optical link 104. In an example embodiment, a given balloon 102A to 102F may use one or more high-power light-emitting diodes (LEDs) to transmit an optical signal. Alternatively, some or all of balloons 102A to 102F may include laser systems for free-space optical communications over optical links 104. Other types of free-space optical communication are possible. Further, in order to receive an optical signal from another balloon via an optical link 104, a given balloon 102A to 102F may include one or more optical receivers. Additional details of example balloons are discussed in greater detail below, with reference to FIG. 3.

In a further aspect, balloons 102A to 102F may utilize one or more of various different RF air-interface protocols for communication ground-based stations 106 and 112 via RF links 108. For instance, some or all of balloons 102A to 102F may be configured to communicate with ground-based stations 106 and 112 using protocols described in IEEE 802.11 (including any of the IEEE 802.11 revisions), various cellular protocols such as GSM, CDMA, UMTS, EV-DO, WiMAX, and/or LTE, and/or one or more propriety protocols developed for balloon-to-ground RF communication, among other possibilities.

In a further aspect, there may scenarios where RF links 108 do not provide a desired link capacity for balloon-to-ground communications. For instance, increased capacity may be desirable to provide backhaul links from a ground-based gateway, and in other scenarios as well. Accordingly, an example network may also include downlink balloons, which could provide a high-capacity air-ground link.

For example, in balloon network 100, balloon 102F could be configured as a downlink balloon. Like other balloons in an example network, a downlink balloon 102F may be operable for optical communication with other balloons via optical links 104. However, downlink balloon 102F may also be configured for free-space optical communication with a ground-based station 112 via an optical link 110. Optical link 110 may therefore serve as a high-capacity link (as compared to an RF link 108) between the balloon network 100 and a ground-based station 112.

Note that in some implementations, a downlink balloon 102F may additionally be operable for RF communication with ground-based stations 106. In other cases, a downlink balloon 102F may only use an optical link for balloon-to-ground communications. Further, while the arrangement shown in FIG. 1 includes just one downlink balloon 102F, an example balloon network can also include multiple downlink balloons. On the other hand, a balloon network can also be implemented without any downlink balloons.

In other implementations, a downlink balloon may be equipped with a specialized, high-bandwidth RF communication system for balloon-to-ground communications, instead of, or in addition to, a free-space optical communication system. The high-bandwidth RF communication system may take the form of an ultra-wideband system, which provides an RF link with substantially the same capacity as the optical links 104. Other forms are also possible.

Balloons could be configured to establish a communication link with space-based satellites in addition to, or as an alternative to, a ground-based communication link.

Ground-based stations, such as ground-based stations 106 and/or 112, may take various forms. Generally, a ground-based station may include components such as transceivers, transmitters, and/or receivers for communication via RF links and/or optical links with a balloon network. Further, a ground-based station may use various air-interface protocols in order communicate with a balloon 102A to 102F over an RF link 108. As such, ground-based stations 106 and 112 may be configured as an access point with which various devices can connect to balloon network 100. Ground-based stations 106 and 112 may have other configurations and/or serve other purposes without departing from the scope of the invention.

Further, some ground-based stations, such as ground-based stations 106 and 112, may be configured as gateways between balloon network 100 and one or more other networks. Such ground-based stations 106 and 112 may thus serve as an interface between the balloon network and the Internet, a cellular service provider's network, and/or other types of networks. Variations on this configuration and other configurations of ground-based stations 106 and 112 are also possible.

A. Mesh Network Functionality

As noted, balloons 102A to 102F may collectively function as a mesh network. More specifically, since balloons 102A to 102F may communicate with one another using free-space optical links, the balloons may collectively function as a free-space optical mesh network.

In a mesh-network configuration, each balloon 102A to 102F may function as a node of the mesh network, which is operable to receive data directed to it and to route data to other balloons. As such, data may be routed from a source balloon to a destination balloon by determining an appropriate sequence of optical links between the source balloon and the destination balloon. These optical links may be collectively referred to as a "lightpath" for the connection between the source and destination balloons. Further, each of the optical links may be referred to as a "hop" on the lightpath.

To operate as a mesh network, balloons 102A to 102F may employ various routing techniques and self-healing algorithms. In some embodiments, a balloon network 100 may employ adaptive or dynamic routing, where a lightpath between a source and destination balloon is determined and set-up when the connection is needed, and released at a later time. Further, when adaptive routing is used, the lightpath may be determined dynamically depending upon the current state, past state, and/or predicted state of the balloon network.

In addition, the network topology may change as the balloons 102A to 102F move relative to one another and/or relative to the ground. Accordingly, an example balloon network 100 may apply a mesh protocol to update the state of the network as the topology of the network changes. For example, to address the mobility of the balloons 102A to 102F, balloon network 100 may employ and/or adapt various techniques that are employed in mobile ad hoc networks (MANETs). Other examples are possible as well.

In some implementations, a balloon network 100 may be configured as a transparent mesh network. More specifically, in a transparent balloon network, the balloons may include components for physical switching that is entirely optical, without any electrical involved in physical routing of optical signals. Thus, in a transparent configuration with optical switching, signals travel through a multi-hop lightpath that is entirely optical.

In other implementations, the balloon network 100 may implement a free-space optical mesh network that is opaque. In an opaque configuration, some or all balloons 102A to 102F may implement optical-electrical-optical (OEO) switching. For example, some or all balloons may include optical cross-connects (OXCs) for OEO conversion of optical signals. Other opaque configurations are also possible. Additionally, network configurations are possible that include routing paths with both transparent and opaque sections.

In a further aspect, balloons in an example balloon network 100 may implement wavelength division multiplexing (WDM), which may help to increase link capacity. When WDM is implemented with transparent switching, physical lightpaths through the balloon network may be subject to the "wavelength continuity constraint." More specifically, because the switching in a transparent network is entirely optical, it may be necessary to assign the same wavelength for all optical links on a given lightpath.

An opaque configuration, on the other hand, may avoid the wavelength continuity constraint. In particular, balloons in an opaque balloon network may include the OEO switching systems operable for wavelength conversion. As a result, balloons can convert the wavelength of an optical signal at each hop along a lightpath. Alternatively, optical wavelength conversion could take place at only selected hops along the lightpath.

Further, various routing algorithms may be employed in an opaque configuration. For example, to determine a primary lightpath and/or one or more diverse backup lightpaths for a given connection, example balloons may apply or consider shortest-path routing techniques such as Dijkstra's algorithm and k-shortest path, and/or edge and node-diverse or disjoint routing such as Suurballe's algorithm, among others. Additionally or alternatively, techniques for maintaining a particular Quality of Service (QoS) may be employed when determining a lightpath. Other techniques are also possible.

B. Station-Keeping Functionality

In an example embodiment, a balloon network 100 may implement station-keeping functions to help provide a desired network topology. For example, station-keeping may involve each balloon 102A to 102F maintaining and/or moving into a certain position relative to one or more other balloons in the network (and possibly in a certain position relative to the ground). As part of this process, each balloon 102A to 102F may implement station-keeping functions to determine its desired positioning within the desired topology, and if necessary, to determine how to move to the desired position.

The desired topology may vary depending upon the particular implementation. In some cases, balloons may implement station-keeping to provide a substantially uniform topology. In such cases, a given balloon 102A to 102F may implement station-keeping functions to position itself at substantially the same distance (or within a certain range of distances) from adjacent balloons in the balloon network 100.

In other cases, a balloon network 100 may have a non-uniform topology. For instance, example embodiments may involve topologies where balloons area distributed more or less densely in certain areas, for various reasons. As an example, to help meet the higher bandwidth demands that are typical in urban areas, balloons may be clustered more densely over urban areas. For similar reasons, the distribution of balloons may be denser over land than over large bodies of water. Many other examples of non-uniform topologies are possible.

In a further aspect, the topology of an example balloon network may be adaptable. In particular, station-keeping functionality of example balloons may allow the balloons to adjust their respective positioning in accordance with a change in the desired topology of the network. For example, one or more balloons could move to new positions to increase or decrease the density of balloons in a given area. Other examples are possible.

In some embodiments, a balloon network 100 may employ an energy function to determine if and/or how balloons should move to provide a desired topology. In particular, the state of a given balloon and the states of some or all nearby balloons may be input to an energy function. The energy function may apply the current states of the given balloon and the nearby balloons to a desired network state (e.g., a state corresponding to the desired topology). A vector indicating a desired movement of the given balloon may then be determined by determining the gradient of the energy function. The given balloon may then determine appropriate actions to take in order to effectuate the desired movement. For example, a balloon may determine an altitude adjustment or adjustments such that winds will move the balloon in the desired manner.

C. Control of Balloons in a Balloon Network

Figure 2:
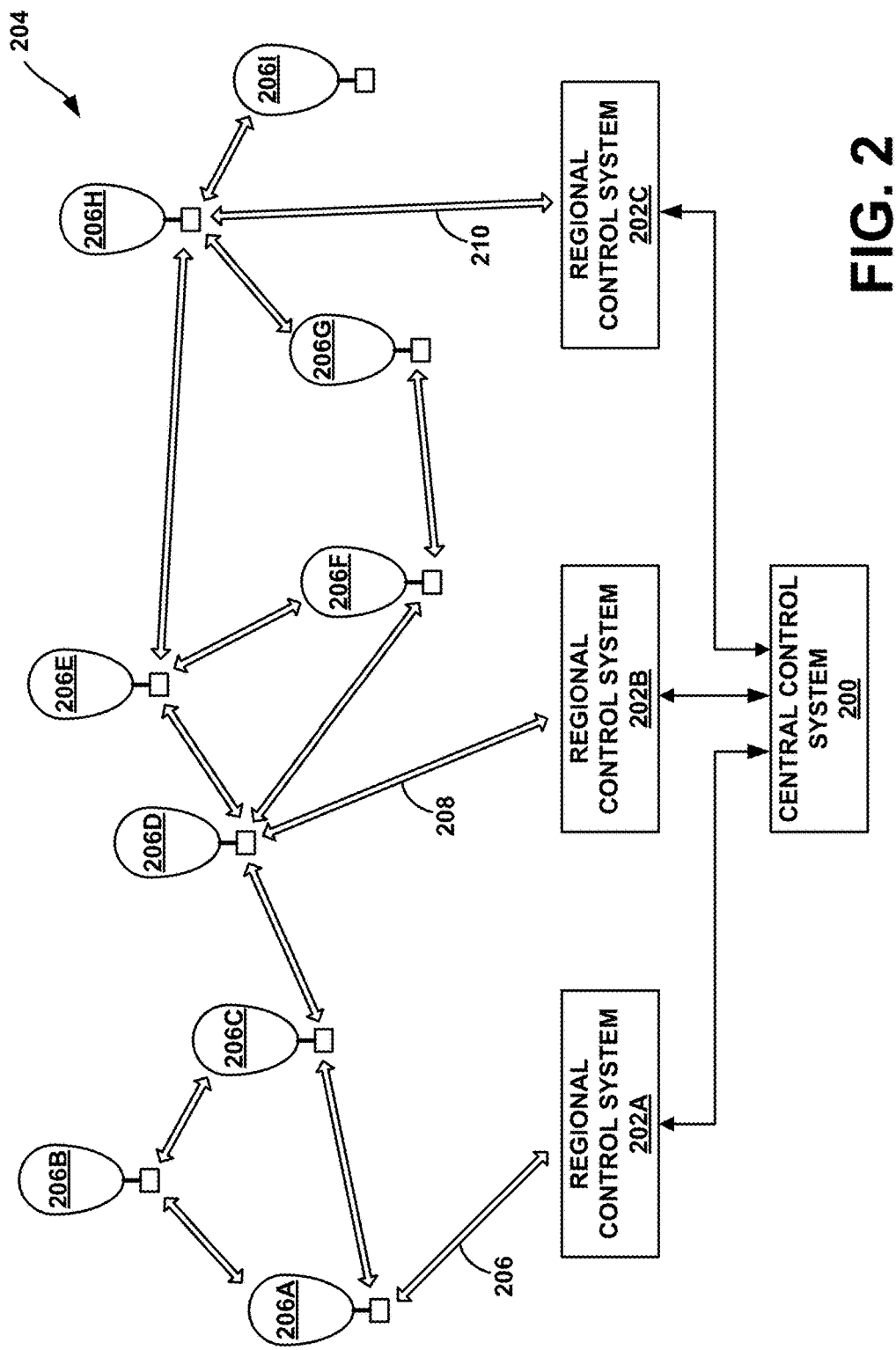
FIG. 2 is a block diagram illustrating a balloon-network control system, according to an example embodiment.

In some embodiments, mesh networking and/or station-keeping functions may be centralized. For example, FIG. 2 is a block diagram illustrating a balloon-network control system, according to an example embodiment. In particular, FIG. 2 shows a distributed control system, which includes a central control system 200 and a number of regional control-systems 202A to 202B. Such a control system may be configured to coordinate certain functionality for balloon network 204, and as such, may be configured to control and/or coordinate certain functions for balloons 206A to 206I.

In the illustrated embodiment, central control system 200 may be configured to communicate with balloons 206A to 206I via number of regional control systems 202A to 202C. These regional control systems 202A to 202C may be configured to receive communications and/or aggregate data from balloons in the respective geographic areas that they cover, and to relay the communications and/or data to central control system 200. Further, regional control systems 202A to 202C may be configured to route communications from central control system 200 to the balloons in their respective geographic areas. For instance, as shown in FIG. 2, regional control system 202A may relay communications and/or data between balloons 206A to 206C and central control system 200, regional control system 202B may relay communications and/or data between balloons 206D to 206F and central control system 200, and regional control system 202C may relay communications and/or data between balloons 206G to 206I and central control system 200.

In order to facilitate communications between the central control system 200 and balloons 206A to 206I, certain balloons may be configured as downlink balloons, which are operable to communicate with regional control systems 202A to 202C. Accordingly, each regional control system 202A to 202C may be configured to communicate with the downlink balloon or balloons in the respective geographic area it covers. For example, in the illustrated embodiment, balloons 206A, 206F, and 206I are configured as downlink balloons. As such, regional control systems 202A to 202C may respectively communicate with balloons 206A, 206F, and 206I via optical links 206, 208, and 210, respectively.

In the illustrated configuration, where only some of balloons 206A to 206I are configured as downlink balloons, the balloons 206A, 206F, and 206I that are configured as downlink balloons may function to relay communications from central control system 200 to other balloons in the balloon network, such as balloons 206B to 206E, 206G, and 206H. However, it should be understood that it in some implementations, it is possible that all balloons may function as downlink balloons. Further, while FIG. 2 shows multiple balloons configured as downlink balloons, it is also possible for a balloon network to include only one downlink balloon.

Note that a regional control system 202A to 202C may in fact just be particular type of ground-based station that is configured to communicate with downlink balloons (e.g. the ground-based station 112 of FIG. 1). Thus, while not shown in FIG. 2, a control system may be implemented in conjunction with other types of ground-based stations (e.g., access points, gateways, etc.).

In a centralized control arrangement, such as that shown in FIG. 2, the central control system 200 (and possibly regional control systems 202A to 202C as well) may coordinate certain mesh-networking functions for balloon network 204. For example, balloons 206A to 206I may send the central control system 200 certain state information, which the central control system 200 may utilize to determine the state of balloon network 204. The state information from a given balloon may include location data, optical-link information (e.g., the identity of other balloons with which the balloon has established an optical link, the bandwidth of the link, wavelength usage and/or availability on a link, etc.), wind data collected by the balloon, and/or other types of information. Accordingly, the central control system 200 may aggregate state information from some or all the balloons 206A to 206I in order to determine an overall state of the network.

The overall state of the network may then be used to coordinate and/or facilitate certain mesh-networking functions such as determining lightpaths for connections. For example, the central control system 200 may determine a current topology based on the aggregate state information from some or all the balloons 206A to 206I. The topology may provide a picture of the current optical links that are available in balloon network and/or the wavelength availability on the links. This topology may then be sent to some or all of the balloons so that a routing technique may be employed to select appropriate lightpaths (and possibly backup lightpaths) for communications through the balloon network 204.

In a further aspect, the central control system 200 (and possibly regional control systems 202A to 202C as well) may also coordinate certain station-keeping functions for balloon network 204. For example, the central control system 200 may input state information that is received from balloons 206A to 206I to an energy function, which may effectively compare the current topology of the network to a desired topology, and provide a vector indicating a direction of movement (if any) for each balloon, such that the balloons can move towards the desired topology. Further, the central control system 200 may use altitudinal wind data to determine respective altitude adjustments that may be initiated to achieve the movement towards the desired topology. The central control system 200 may provide and/or support other station-keeping functions as well.

FIG. 2 shows a distributed arrangement that provides centralized control, with regional control systems 202A to 202C coordinating communications between a central control system 200 and a balloon network 204. Such an arrangement may be useful to provide centralized control for a balloon network that covers a large geographic area. In some embodiments, a distributed arrangement may even support a global balloon network that provides coverage everywhere on earth. A distributed-control arrangement may be useful in other scenarios as well.

Further, it should be understood that other control-system arrangements are possible. For instance, some implementations may involve a centralized control system with additional layers (e.g., sub-region systems within the regional control systems, and so on). Alternatively, control functions may be provided by a single, centralized, control system, which communicates directly with one or more downlink balloons.

In some embodiments, control and coordination of a balloon network may be shared between a ground-based control system and a balloon network to varying degrees, depending upon the implementation. In fact, in some embodiments, there may be no ground-based control systems. In such an embodiment, all network control and coordination functions may be implemented by the balloon network itself. For example, certain balloons may be configured to provide the same or similar functions as central control system 200 and/or regional control systems 202A to 202C. Other examples are also possible.

Furthermore, control and/or coordination of a balloon network may be de-centralized. For example, each balloon may relay state information to, and receive state information from, some or all nearby balloons. Further, each balloon may relay state information that it receives from a nearby balloon to some or all nearby balloons. When all balloons do so, each balloon may be able to individually determine the state of the network. Alternatively, certain balloons may be designated to aggregate state information for a given portion of the network. These balloons may then coordinate with one another to determine the overall state of the network.

Further, in some aspects, control of a balloon network may be partially or entirely localized, such that it is not dependent on the overall state of the network. For example, individual balloons may implement station-keeping functions that only consider nearby balloons. In particular, each balloon may implement an energy function that takes into account its own state and the states of nearby balloons. The energy function may be used to maintain and/or move to a desired position with respect to the nearby balloons, without necessarily considering the desired topology of the network as a whole. However, when each balloon implements such an energy function for station-keeping, the balloon network as a whole may maintain and/or move towards the desired topology.

As an example, each balloon A may receive distance information $d_1$ to $d_k$ with respect to each of its k closest neighbors. Each balloon A may treat the distance to each of the k balloons as a virtual spring with vector representing a force direction from the first nearest neighbor balloon i toward balloon A and with force magnitude proportional to $d_i$. The balloon A may sum each of the k vectors and the summed vector is the vector of desired movement for balloon A. Balloon A may attempt to achieve the desired movement by controlling its altitude.

Alternatively, this process could assign the force magnitude of each of these virtual forces equal to $d_i \times d_f$, wherein $d_f$ is proportional to the distance to the second nearest neighbor balloon, for instance.

In another embodiment, a similar process could be carried out for each of the k balloons and each balloon could transmit its planned movement vector to its local neighbors. Further rounds of refinement to each balloon's planned movement vector can be made based on the corresponding planned movement vectors of its neighbors. It will be evident to those skilled in the art that other algorithms could be implemented in a balloon network in an effort to maintain a set of balloon spacings and/or a specific network capacity level over a given geographic location.

D. Example Balloon Configuration

Figure 3:
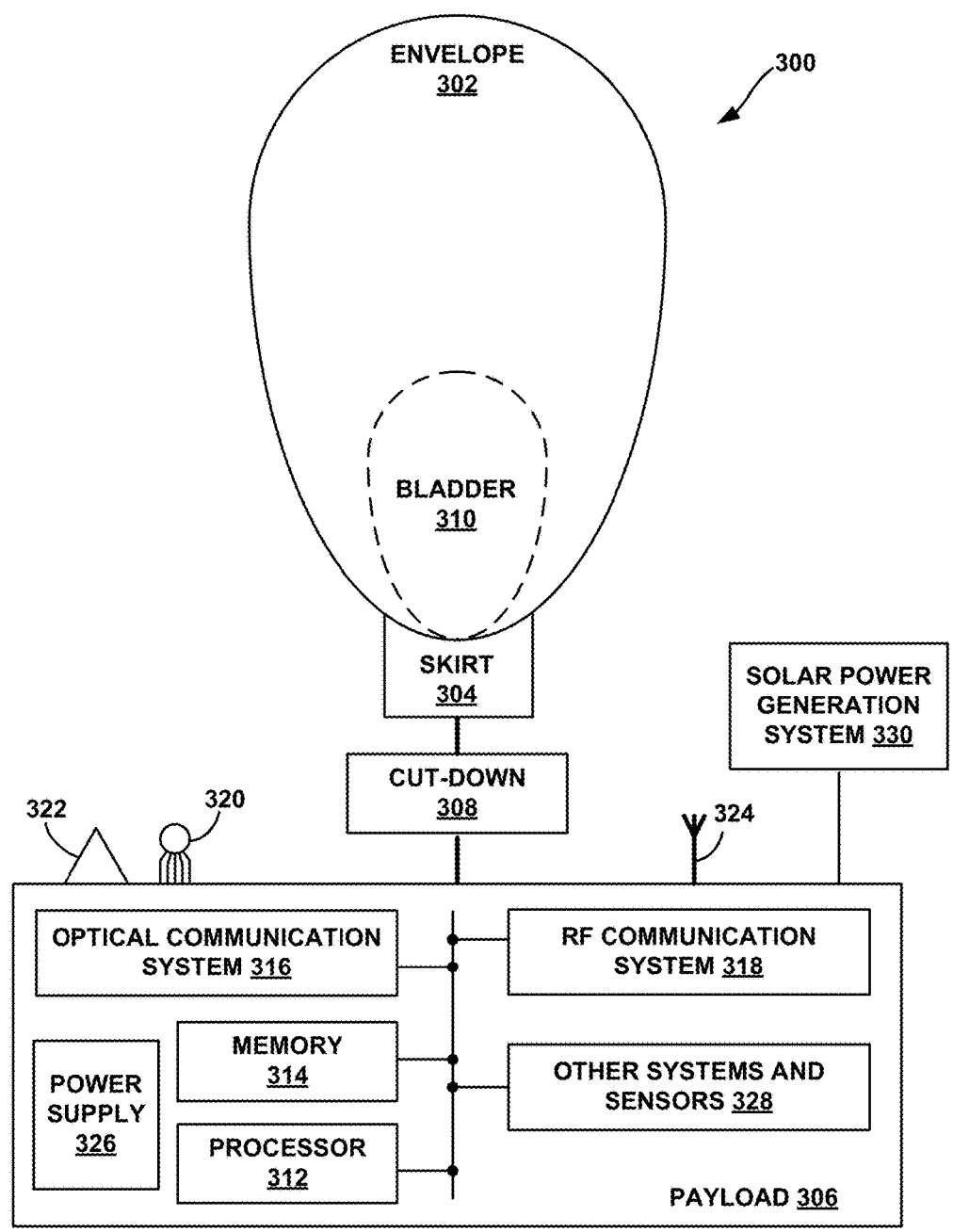
FIG. 3 is a simplified block diagram illustrating a high-altitude balloon, according to an example embodiment.

Various types of balloon systems may be incorporated in an example balloon network. As noted above, an example embodiment may utilize high-altitude balloons, which could typically operate in an altitude range between 17 km and 25 km. FIG. 3 shows a high-altitude balloon 300, according to an example embodiment. As shown, the balloon 300 includes an envelope 302, a skirt 304, a payload 306, and a cut-down system 308, which is attached between the balloon 302 and payload 304. Those skilled in the art will understand that in other embodiments, other types of aerial vehicles, configured similarly as balloons described herein, may also be utilized.

The envelope 302 and skirt 304 may take various forms, which may be currently well-known or yet to be developed. For instance, the envelope 302 and/or skirt 304 may be made of a highly-flexible latex material or may be made of a rubber material such as chloroprene. In one example embodiment, the envelope and/or skirt could be made of metalized Mylar or BoPet. Other materials are also possible. Further, the shape and size of the envelope 302 and skirt 304 may vary depending upon the particular implementation. Additionally, the envelope 302 may be filled with various different types of gases, such as helium and/or hydrogen. Other types of gases are possible as well.

The payload 306 of balloon 300 may include a processor 312 and on-board data storage, such as memory 314. The memory 314 may take the form of or include a non-transitory computer-readable medium. The non-transitory computer-readable medium may have instructions stored thereon, which can be accessed and executed by the processor 312 in order to carry out the balloon functions described herein.

The payload 306 of balloon 300 may also include various other types of equipment and systems to provide a number of different functions. For example, payload 306 may include optical communication system 316, which may transmit optical signals via an ultra-bright LED system 320, and which may receive optical signals via an optical-communication receiver 322 (e.g., a photodiode receiver system). Further, payload 306 may include an RF communication system 318, which may transmit and/or receive RF communications via an antenna system 340.

The payload 306 may also include a power supply 326 to supply power to the various components of balloon 300. The power supply 326 could include a rechargeable battery. In other embodiments, the power supply 326 may additionally or alternatively represent other means known in the art for producing power. In addition, the balloon 300 may include a solar power generation system 327. The solar power generation system 327 may include solar panels and could be used to generate power that charges and/or is distributed by power supply 326.

Further, payload 306 may include various types of other systems and sensors 328. For example, payload 306 may include one or more video and/or still cameras, a GPS system, various motion sensors (e.g., accelerometers, magnetometers, gyroscopes, and/or compasses), and/or various sensors for capturing environmental data. Further, some or all of the components within payload 306 may be implemented in a radiosonde or other probe, which may be operable to measure, e.g., pressure, altitude, geographical position (latitude and longitude), temperature, relative humidity, and/or wind speed and/or wind direction, among other information.

As noted, balloon 300 includes an ultra-bright LED system 320 for free-space optical communication with other balloons. As such, optical communication system 316 may be configured to transmit a free-space optical signal by modulating the ultra-bright LED system 320. The optical communication system 316 may be implemented with mechanical systems and/or with hardware, firmware, and/or software. Generally, the manner in which an optical communication system is implemented may vary, depending upon the particular application. The optical communication system 316 and other associated components are described in further detail below.

In a further aspect, balloon 300 may be configured for altitude control. For instance, balloon 300 may include a variable buoyancy system, which is configured to change the altitude of the balloon 300 by adjusting the volume and/or density of the gas in the balloon 300. A variable buoyancy system may take various forms, and may generally be any system that can change the volume and/or density of gas in the envelope 302.

In an example embodiment, a variable buoyancy system may include a bladder 310 that is located inside of envelope 302. The bladder 310 could be an elastic chamber configured to hold liquid and/or gas. Alternatively, the bladder 310 need not be inside the envelope 302. For instance, the bladder 310 could be a ridged bladder that could be pressurized well beyond neutral pressure. The buoyancy of the balloon 300 may therefore be adjusted by changing the density and/or volume of the gas in bladder 310. To change the density in bladder 310, balloon 300 may be configured with systems and/or mechanisms for heating and/or cooling the gas in bladder 310. Further, to change the volume, balloon 300 may include pumps or other features for adding gas to and/or removing gas from bladder 310. Additionally or alternatively, to change the volume of bladder 310, balloon 300 may include release valves or other features that are controllable to allow gas to escape from bladder 310. Multiple bladders 310 could be implemented within the scope of this disclosure. For instance, multiple bladders could be used to improve balloon stability.

In an example embodiment, the envelope 302 could be filled with helium, hydrogen or other lighter-than-air material. The envelope 302 could thus have an associated upward buoyancy force. In such an embodiment, air in the bladder 310 could be considered a ballast tank that may have an associated downward ballast force. In another example embodiment, the amount of air in the bladder 310 could be changed by pumping air (e.g., with an air compressor) into and out of the bladder 310. By adjusting the amount of air in the bladder 310, the ballast force may be controlled. In some embodiments, the ballast force may be used, in part, to counteract the buoyancy force and/or to provide altitude stability.

In another embodiment, a portion of the envelope 302 could be a first color (e.g., black) and/or a first material from the rest of envelope 302, which may have a second color (e.g., white) and/or a second material. For instance, the first color and/or first material could be configured to absorb a relatively larger amount of solar energy than the second color and/or second material. Thus, rotating the balloon such that the first material is facing the sun may act to heat the envelope 302 as well as the gas inside the envelope 302. In this way, the buoyancy force of the envelope 302 may increase. By rotating the balloon such that the second material is facing the sun, the temperature of gas inside the envelope 302 may decrease. Accordingly, the buoyancy force may decrease. In this manner, the buoyancy force of the balloon could be adjusted by changing the temperature/volume of gas inside the envelope 302 using solar energy. In such embodiments, it is possible that a bladder 310 may not be a necessary element of balloon 300. Thus, various contemplated embodiments, altitude control of balloon 300 could be achieved, at least in part, by adjusting the rotation of the balloon with respect to the sun.

Further, a balloon 306 may include a navigation system (not shown). The navigation system may implement station-keeping functions to maintain position within and/or move to a position in accordance with a desired topology. In particular, the navigation system may use altitudinal wind data to determine altitudinal adjustments that result in the wind carrying the balloon in a desired direction and/or to a desired location. The altitude-control system may then make adjustments to the density of the balloon chamber in order to effectuate the determined altitudinal adjustments and cause the balloon to move laterally to the desired direction and/or to the desired location. Alternatively, the altitudinal adjustments may be computed by a ground-based or satellite-based control system and communicated to the high-altitude balloon. In other embodiments, specific balloons in a heterogeneous balloon network may be configured to compute altitudinal adjustments for other balloons and transmit the adjustment commands to those other balloons.

As shown, the balloon 300 also includes a cut-down system 308. The cut-down system 308 may be activated to separate the payload 306 from the rest of balloon 300. The cut-down system 308 could include at least a connector, such as a balloon cord, connecting the payload 306 to the envelope 302 and a means for severing the connector (e.g., a shearing mechanism or an explosive bolt). In an example embodiment, the balloon cord, which may be nylon, is wrapped with a nichrome wire. A current could be passed through the nichrome wire to heat it and melt the cord, cutting the payload 306 away from the envelope 302.

The cut-down functionality may be utilized anytime the payload needs to be accessed on the ground, such as when it is time to remove balloon 300 from a balloon network, when maintenance is due on systems within payload 306, and/or when power supply 326 needs to be recharged or replaced.

In an alternative arrangement, a balloon may not include a cut-down system. In such an arrangement, the navigation system may be operable to navigate the balloon to a landing location, in the event the balloon needs to be removed from the network and/or accessed on the ground. Further, it is possible that a balloon may be self-sustaining, such that it does not need to be accessed on the ground. In other embodiments, in-flight balloons may be serviced by specific service balloons or another type of aerostat or aircraft.

III. Balloon Network with Optical and RF Links Between Balloons

In some embodiments, a high-altitude-balloon network may include super-node balloons, which communicate with one another via optical links, as well as sub-node balloons, which communicate with super-node balloons via RF links.

Generally, the optical links between super-node balloons may be configured to have more bandwidth than the RF links between super-node and sub-node balloons. As such, the super-node balloons may function as the backbone of the balloon network, while the sub-nodes may provide sub-networks providing access to the balloon network and/or connecting the balloon network to other networks.

Figure 4:
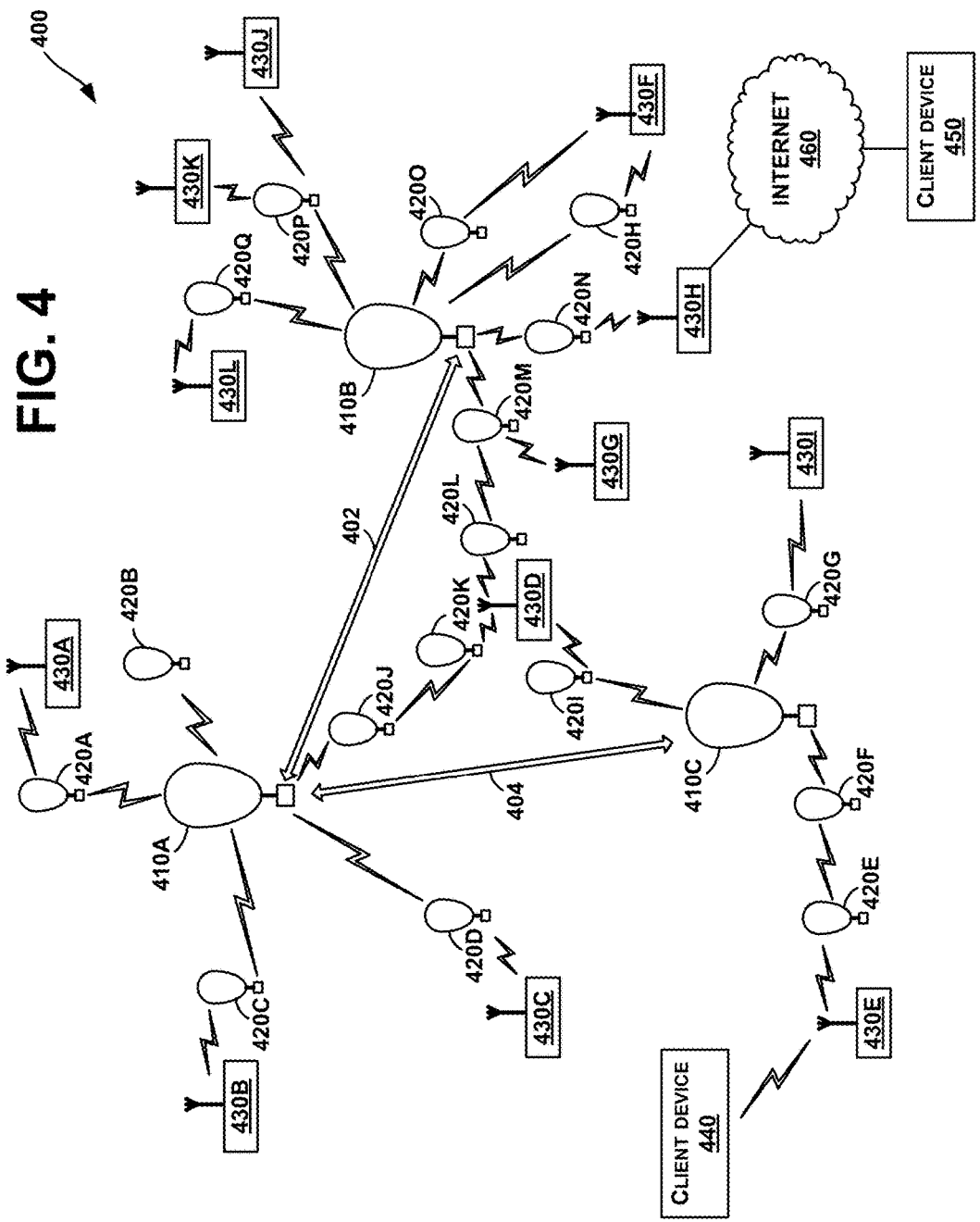
FIG. 4 is a simplified block diagram illustrating a balloon network that includes super-nodes and sub-nodes, according to an example embodiment.

FIG. 4 is a simplified block diagram illustrating a balloon network that includes super-nodes and sub-nodes, according to an example embodiment. More specifically, FIG. 4 illustrates a portion of a balloon network 400 that includes super-node balloons 410A to 410C (which may also be referred to as "super-nodes") and sub-node balloons 420 (which may also be referred to as "sub-nodes").

Each super-node balloon 410A to 410C may include a free-space optical communication system that is operable for packet-data communication with other super-node balloons. As such, super-nodes may communicate with one another over optical links. For example, in the illustrated embodiment, super-node 410A and super-node 401B may communicate with one another over optical link 402, and super-node 410A and super-node 401C may communicate with one another over optical link 404.

Each of the sub-node balloons 420 may include a radio-frequency (RF) communication system that is operable for packet-data communication over one or more RF air interfaces. Accordingly, each super-node balloon 410A to 410C may include an RF communication system that is operable to route packet data to one or more nearby sub-node balloons 420. When a sub-node 420 receives packet data from a super-node 410, the sub-node 420 may use its RF communication system to route the packet data to a ground-based station 430 via an RF air interface.

As noted above, the super-nodes 410A to 410C may be configured for both longer-range optical communication with other super-nodes and shorter-range RF communications with nearby sub-nodes 420. For example, super-nodes 410A to 410C may use using high-power or ultra-bright LEDs to transmit optical signals over optical links 402, 404, which may extend for as much as 100 miles, or possibly more. Configured as such, the super-nodes 410A to 410C may be capable of optical communications at speeds of 10 to 50 GB/sec or more.

A larger number of balloons may be configured as sub-nodes, which may communicate with ground-based Internet nodes at speeds on the order of approximately 10 MB/sec. Configured as such, the sub-nodes 420 may be configured to connect the super-nodes 410 to other networks and/or to client devices.

Note that the data speeds and link distances described in the above example and elsewhere herein are provided for illustrative purposes and should not be considered limiting; other data speeds and link distances are possible. Further, note that client devices may also be configured to connect with other types of balloon networks, such as the balloon networks shown in FIGS. 1 and 2.

In some embodiments, the super-nodes 410A to 410C may function as a core network, while the sub-nodes 420 function as one or more access networks to the core network.

In such an embodiment, some or all of the sub-nodes 420 may also function as gateways to the balloon network 400. Additionally or alternatively, some or all of ground-based stations 430 may function as gateways to the balloon network 400.

Since balloons in an exemplary hierarchical balloon network may collectively function as a mesh network, routing may involve determining: (a) a path between a ground-based station and a source super-node balloon data via one or more sub-node balloons, (b) a path between the source super-node balloon and a target super-node balloon, which may be a single hop or may be a multi-hop path via one or more other super-node balloons, and (c) a path between the target super-node balloon and a target ground-based station via one or more sub-node balloons.

To provide a specific example of routing in a hierarchical balloon network, consider an implementation where ground-based station 430E is an access point, and ground-based station 430F is a gateway between hierarchical balloon network 400 and the Internet 460. As such, a first client device 440 may connect to the Internet 460 via ground-based station 430E and balloon network 400. Further, a second client device 450 may connect to the Internet 460, and thus may be connected to the balloon network 400 via ground-based station 430H.

In this scenario, the first client device 440 may send data to the second client device 450. When this occurs, data from client device 440 may be routed from ground-based station 430E to super-node 410C via sub-nodes 420E and 420F.

Further, routing may involve path determination through the backbone network of super-nodes to determine, e.g., a path from the source super-node to the target super-node. Thus, when data sent from the first client device 440 to the second client device 450 is received at super-node balloon 410C, a lightpath may be determined to the target super-node balloon 410B. In the illustrated state of balloon network 400, the determined lightpath may include optical links 402 and 404.

Various mesh routing techniques may be applied in order to route data through the super-nodes to a target super-node. (The target super-node is typically a super-node balloon with an RF link to a sub-node that is serving the target ground-based station.) For example, routing through the backbone network formed by the super-node balloons may be accomplished in a similar manner as described in reference to the balloon networks illustrated in FIGS. 1 and 2. In other words, the super-nodes may be thought of as a distinct network for purposes of routing, such that paths between the super-node balloons and ground-based stations via sub-node balloons may be determined separately from paths through the super-node balloons.

Further, as the super-nodes locations may change relative to the ground and relative to one another, the topology of the balloon network may change over time. Accordingly, the routing technique may take into account the current network topology.

In another aspect, note that in the above example, there is only one path between ground-based station 430E and super-node 410C (i.e., the multi-hop path with RF links connecting ground-based station 430E, sub-node 420E, and sub-node 420F). As such, there is no path determination needed as there is only one path between the ground-based station and the source super-node balloon. However, it is possible that there may be multiple paths between a ground-based station and a source super-node balloon. In this case, routing may involve path determination between a ground-based station and a source super-node balloon.

For example, when the second client device 450 sends data to the first client device 440 via Internet 460, there are two paths between ground-based station 430F and super-node 410B (e.g., via sub-node 420H or sub-node 4200). As such, routing may involve path determination to select between the available paths. Alternatively, a flooding technique may be used in which data is sent via all paths between a ground-based station and a source super-node.

In a further aspect, note that similar principals apply when routing data between a target super-node balloon and a target ground based station, depending upon the topology of the one or more sub-node balloons connecting the target super-node balloon and a target ground based station.

IV. Client-Device Link Between Balloon Network and Terrestrial Network

As noted above, client devices may be configured to communicate with balloons in a balloon network. In an example embodiment, a client device may be configured to provide a data link between a balloon network and a terrestrial data network, such as the Internet. Further, a client device may report and/or receive compensation for data that is relayed between the balloon network and the terrestrial data network.

Figure 5A:
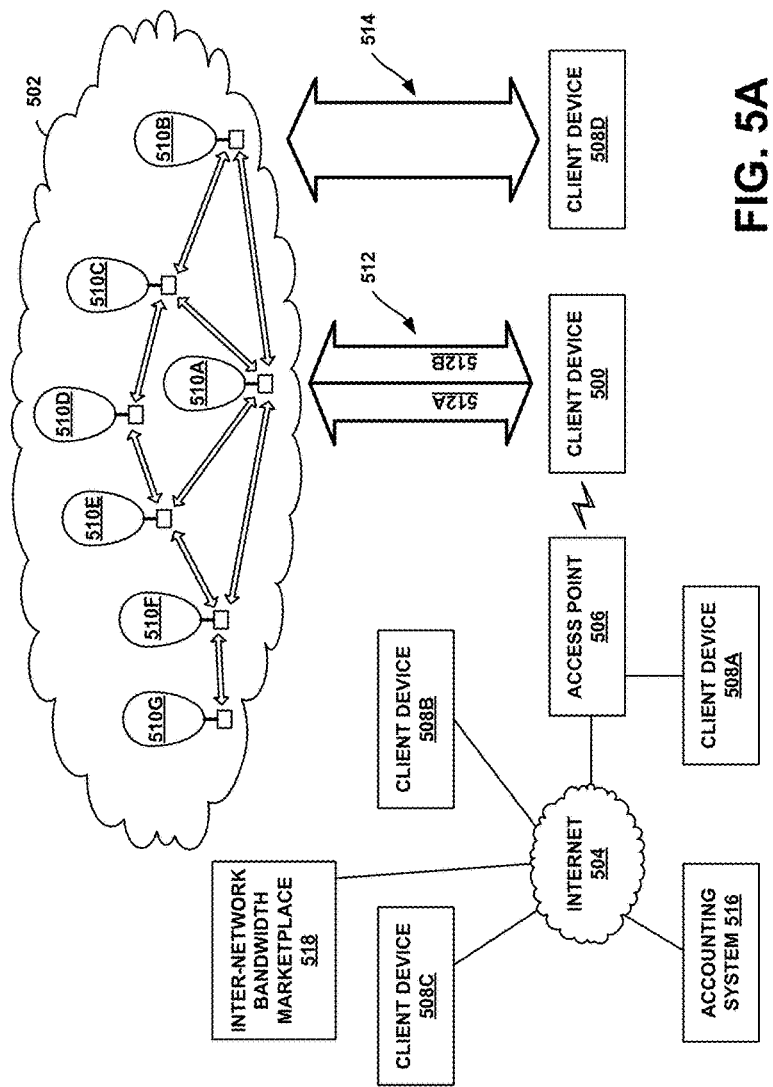
FIG. 5A is a block diagram illustrating a client device that is configured to provide a data link between a balloon network and a terrestrial data network.

FIG. 5A is a block diagram illustrating a client device that is configured to provide a data link between a balloon network and a terrestrial data network. Specifically, in the illustrated example, client device 500 is configured to provide a data link between balloon network 502, which includes balloons 510A to 501G, and the Internet 504. FIG. 5A also shows an access point 506 and a number of other client devices 508A to 508D. Client devices, such as client devices 500 and 508A to 508D may various types of computing devices via which end users can engage in data communications, such as personal computers, laptop computers, tablet computers, cellular phones, and/or wearable computers, among other examples.

Both client device 508D and client device 500 are configured to engage in data communications via balloon network 502. Specifically, client device 500 is operable to communicate via balloon network 502 over a link 512 to balloon 510A. Similarly, client device 508 is operable to communicate via balloon network 502 over a link 514 to balloon 510B.

Further, client device 500 is operable to communicate via the Internet 504 via a connection to access point 506. Configured as such, client device may be operable to both: (a) engage in data communications via a balloon network 502 and/or via Internet 504 and (b) provide a data link between balloon network 502 and Internet 504. Thus, client device 500 may operate as a typical client device, in that client device 500 includes or provides access to user interfaces via which a user could, e.g., engage in a phone call, surf the Internet, send e-mail, etc. However, client device 500 is also configured to provide an inter-network link, by allowing some or all of its bandwidth over link 512 to be utilized for transfer of data intended for other client devices between Internet 504 and balloon network 502.

For example, in order to send data to client device 508C, client device 508D may transmit data over link 514 to balloon 510B, which may then route the data through balloon network 502 to balloon 510A. The data may then be routed the data from Balloon 510A over link 512 to client device 500, then to access point 506, and then via Internet 504 to client device 508C. In a similar manner, data sent by client 508C to client device 508D may be routed from Internet 504 to balloon 510A via the Internet 504 and access point 506, and then through balloon network 502 to balloon 510B, which can send the data to client device 508D. Further, note that client device 500 could facilitate communication via balloon network 502 for another client device which connects to the same access point 506 as client device 500, such as client device 508A, directly through the access point 506 (e.g., without necessarily having the communication routed through Internet 504).

In an example embodiment, links between ground-based client devices, such as client devices 500 and 508D, and the balloon network 502, such as links 512 and 514, may be RF links and/or wireless optical links. Accordingly, various RF air-interface protocols and/or optical communication protocols may be used for communications between balloon network 502 and client devices 500 and 508D over links 512 and 514. For example, balloon network 502 and client devices 500 and 508D may use an LTE protocol to communicate over links 512 and 514. Other RF protocols and/or optical protocols are also possible.

When a client device 500 provides an inter-network link, the air-interface link 512 may be implemented in various ways. For example, two separate communication channels 512A and 512B may be established between client device 500 and balloon 510A, one communication channel 512A for the device's own communications (e.g., data communications directed to or originating from client device 500), and one communication channel 512B for communications via the inter-network link (e.g., communications that originate from a client device, and are directed to a client device, other than client device 500).

Accordingly, client device 500 may be configured to provide an inter-network link by establishing a separate, dedicated communication channel for inter-network data communications directed to other client devices. As such, a client device may operate as a typical client device with respect to data that is sent and received via the communication channel 512A dedicated to the device's own communications, and may function as, e.g., a router, bridge, or repeater with respect to data that is sent and received via the communication channel 512B that is designated for an inter-network link.

Alternatively, there may not be a dedicated inter-network communication channel between a client device and a balloon network. Instead, client device 500 may simply include routing or switching functionality that analyzes, e.g., metadata from data packets, to determine whether packets received from balloon network 502 or access point 506 are part of its own communications or are directed to another client device, and to process and/or relay packets accordingly.

In a further aspect, access point 506 may take various forms. In an example embodiment, access point 506 may be a WiFi access point that operates according to an IEEE 802.11 protocol. As another example, access point 506 could be a base station in a cellular data network. A client device may also utilize other protocols for communications with an access point and/or other nodes in a terrestrial data network (e.g., a network gateway). Further, client device may provide an inter-network link via multiple terrestrial data networks. For example, a client device could provide an inter-network link between a balloon network and the Internet via a local WiFi network. Other examples are also possible.

In another aspect, the link between client device 500 and access point 506 may take various forms. For example, the link between a client device and an access point may include two separate communication channels, with a dedicated channel for an inter-network link. Alternatively, both inter-network communications directed to other client devices, and the device's own communications may be conducted via the same communication channel, and client device 500 may be configured to distinguish between data directed to other client devices and data from its own communications.

In some embodiments, client device 500 may provide an inter-network link by functioning as a repeater, in addition to providing its standard client-device functionality. In such an embodiment, client device 500 may be configured simply to forward data received from access point 506 to balloon 510A, and vice versa.

In some embodiments, client device 500 may provide an inter-network link by operating as a router, in addition to providing its standard client-device functionality. For example, client device 500 may be connected to access point 506 via a WiFi connection and connected to balloon network 502 via an LTE connection to balloon 510A. As such, when a data packet is received at client device 500, the client device 500 may read address information in the packet to determine its ultimate destination. Then, if the packet is intended for another client device, it may use information from its own routing table or routing policy (or a routing table or routing policy that is otherwise accessible to the device), and send the packet to the next network on its path (e.g., Internet 504 via access point 506 or balloon network 502).

In a further aspect, a client device may format and/or process data streams to provide an inter-network link between a balloon network and a terrestrial network that utilize different communication protocols. To do so, a client device 500 may provide an inter-network link by operating as a gateway, which provides an interface between balloon network 502 and a terrestrial data network. Configured as such, client device 500 may implement protocol translation/mapping to perform protocol conversions between balloon-network protocols and terrestrial-network protocols. As a specific example, client device 500 may receive data over a WiFi connection with access point 506, which is thus formatted according to an 802.11 protocol, and re-format the received data for transmission over an LTE connection with balloon 510A, and vice versa. Other examples are also possible.

In an example embodiment, a client device may operate as a synchronous inter-network link, which sends data on as it is received (possibly with a some type of buffer if an incoming data rate exceeds the bandwidth on the outbound link). In other embodiments, a client device may function as an asynchronous inter-network link. In particular, the client device may store data that is received from the balloon network or from the terrestrial data network, and wait until a later time when the client device is not utilizing its available bandwidth for its own communications, before sending the stored data on to the terrestrial data or the balloon network, respectively.

FIG. 5A also shows an accounting system 516. In an example embodiment, client device 500 may be configured to notify accounting system 516 of its operation as an inter-network link, such that a user-account associated with client device 500 can receive credit accordingly. Further, in the illustrated configuration, accounting system 516 is accessible to client device 500 via the Internet 504. However, a client device may additionally or alternatively communicate with an accounting system via other networks, without departing from the scope of the invention.

In some implementations, accounting system 516 may update a user-account to reflect monetary credit based on the operation of a corresponding client device as an inter-network link. For example, accounting system 516 could determine a dollar amount based on an amount of time for which client device 500 provided an inter-network link, and credit the determined dollar amount to the user-account corresponding to client device 500 (e.g., a user-account established by the owner of client device 500). As another example, accounting system 516 could determine a dollar amount based on the amount of data that was relayed between balloon network 502 and access point 506 via the inter-network link provided by client device 500. As a specific example, the dollar amount for a data communication could be based on a predetermined dollar-per-kilobyte ($/kB) value. Other examples are also possible.

Accounting system 516 could also credit a user-account with non-monetary credit based on the operation of a corresponding client device as an inter-network link. For example, accounting system 516 may award a certain number of points per unit of time that client device 500 is available as an inter-network link between balloon network 502 and Internet 504, or per unit of data (e.g., points per kB) that is sent and/or received by client device 500 due to the client device's operation as an inter-network link. Such points could then be redeemed for, e.g., goods or services. Other non-monetary credits are also possible.

FIG. 5A also shows an inter-network bandwidth marketplace 518, which may facilitate transactions for inter-network links between client-devices 500, 508A, 508B, and/or 508C, and access point 506 and/or other nodes in a terrestrial data network such as Internet 504. Inter-network bandwidth marketplace 518 will be described in greater detail in reference to FIG. 5B.

The arrangement shown in FIG. 5A is provided as an example, and is not intended to be limiting. Other arrangements of the illustrated components and/or other components are possible.

V. Illustrative Marketplace Systems

Figure 5B:
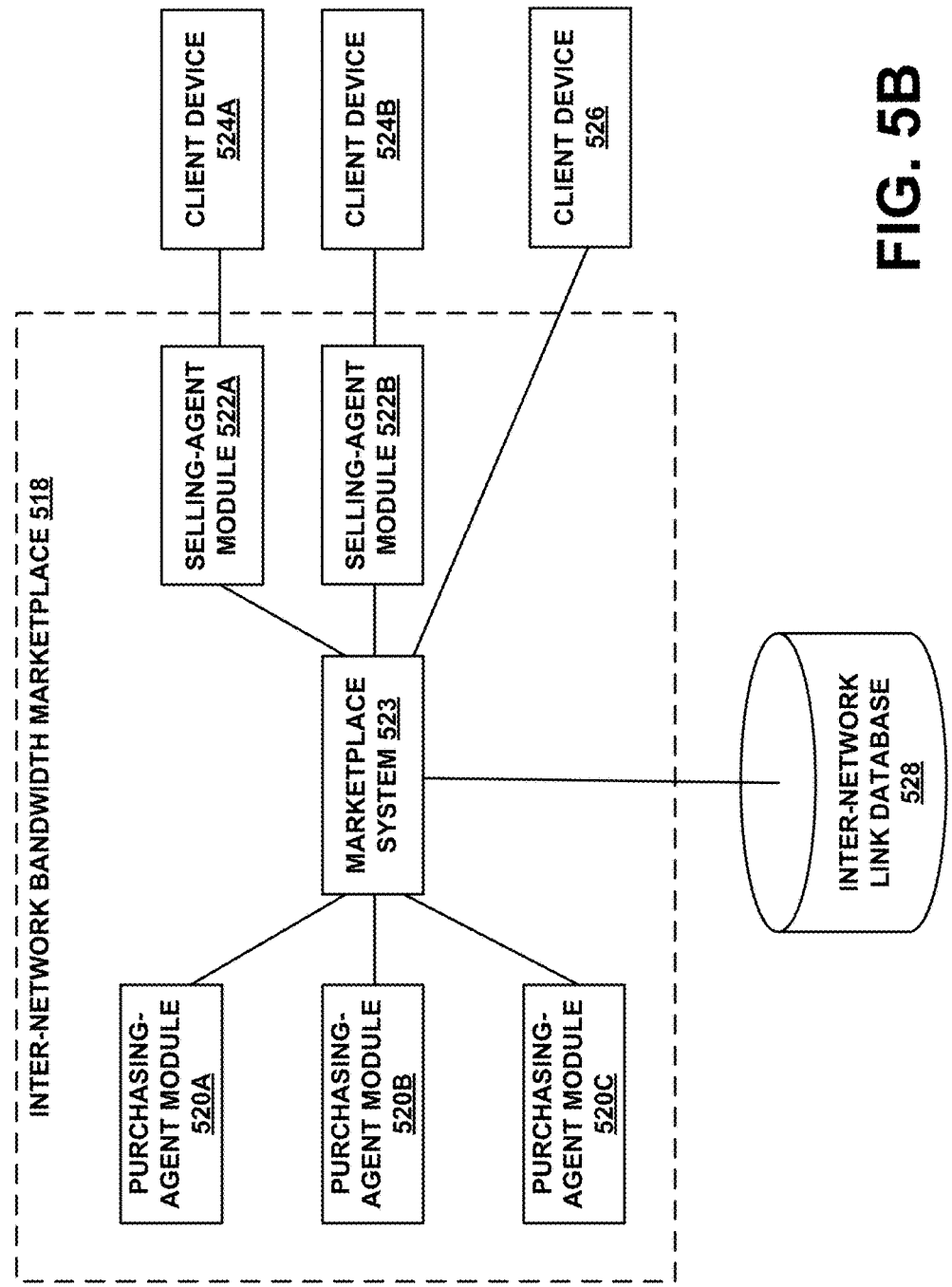
FIG. 5B is a simplified block diagram showing more detail of the inter-network bandwidth marketplace that is also shown in FIG. 5A.

FIG. 5B is a simplified block diagram showing more detail of the inter-network bandwidth marketplace 518 that is also shown in FIG. 5A. As shown, the inter-network bandwidth marketplace 518 includes purchasing-agent modules 520A to 520C and selling-agent modules 522A and 522B. Further, the inter-network bandwidth marketplace 518 may include marketplace system 523, which is a computing system configured to facilitate communications and/or transactions between selling-agent modules 522A and 522B, as sellers of inter-network bandwidth (i.e., of inter-network links), and purchasing-agent modules 520A to 520C, as buyers of inter-network bandwidth.

A given purchasing-agent module 520A to 520C may take the form of or include software, hardware, and/or firmware that is executable to provide the purchasing-agent functionality described herein. For example, given purchasing-agent module 520A to 520C may be executable program instructions stored on a non-transitory medium on a server system that is part of or in communication with inter-network bandwidth marketplace 518. A purchasing-agent module could also be implemented on a computing device that is separate from and configured to communicate with inter-network bandwidth marketplace 518.

A given purchasing-agent module 520A to 520C may be implemented on behalf of a service provider and/or network operator in order to detect when there is a need for additional inter-network bandwidth and responsively purchase bandwidth over available inter-network links. In particular, a purchasing-agent module 520A to 520C may be configured to: (i) determine when a demand exists for inter-network bandwidth between a balloon network and a terrestrial data network, (ii) determine one or more offers to provide an inter-network link that increases the inter-network bandwidth between the balloon network and the terrestrial data network, wherein each offer is associated with a corresponding client device, (iii) based at least in part on a comparison of: (a) the demand for inter-network bandwidth and (b) the one or more offers to provide an inter-network link, select one or more of the offers to provide an inter-network link; and (iv) initiate a process to establish an inter-network link at each client device that corresponds to one of the one or more selected offers.

In a further aspect, a service provider and/or a network operator of a balloon network, a service provider and/or a network operator of a terrestrial network, or another entity, may be able to set parameters for a purchasing-agent module to buy inter-network bandwidth on their behalf. For example, a service provider or network operator could set parameters to indicate how much they are willing to pay to reduce network congestion by a certain amount, how much they are willing to pay to reduce latency by a certain amount, and so on. The particular parameters that may be set for a purchasing-agent module may vary, depending upon the particular implementation.

A given selling-agent module 522A or 522B may take the form of or include software, hardware, and/or firmware that is executable to provide the selling-agent functionality described herein. For example, given selling-agent module 522A or 522B may take the form of executable program instructions stored on a non-transitory medium on a server system that is part of or in communication with inter-network bandwidth marketplace 518.

Further, a given selling-agent module 522A or 522B may be implemented on behalf of a client device 524A or 524B in order to determine when the client device has bandwidth available for an inter-network link, to determine offer pricing for the available bandwidth, and/or to offer the available bandwidth via inter-network bandwidth marketplace 518. A selling-agent module could also be implemented by a client device that is configured to communicate with inter-network bandwidth marketplace 518, such as client device 526.

In a further aspect, a given selling selling-agent module 522A or 522B should be understood to be a module that at least partially automates the process of detecting available bandwidth and offering an inter-network link, on behalf of a client device 524A or 524B. However, it is also contemplated that a client device, such as client device 526, may be configured to allow a user to manually offer bandwidth for an inter-network link on inter-network bandwidth marketplace 518, without using an automated selling-agent module 524A or 524B. Such a client device 526 may be said to "directly" communicate an offer to inter-network bandwidth marketplace 518. In this context, a "direct" communication should be understood to mean that the client device 526 sends an offer for an inter-network link to the inter-network bandwidth marketplace 518 without use of a selling-agent module 522A or 522B; however, a direct communication in this context does not necessarily mean that there is a direct connection between the client device 526 and inter-network bandwidth marketplace 518.

In a further aspect, a user for a client device may be able to set parameters for a selling-agent module to offer and sell an inter-network link on their behalf. For example, a user could set parameters to indicate an amount of bandwidth that is desired for their own use, such that excess bandwidth may be offered for an inter-network link. Further, a user might set parameters to indicate a desired amount of bandwidth for specific activities. For example, a user might set parameters such that more bandwidth is reserved for their own use when they are watching a streaming video, than when they are viewing a website. Yet further, a user might set parameters that indicate the timing with which an inter-network link should be offered via their client device. As an example, a user might set parameters such that an inter-network link is only offered late at night and/or early in the morning, when the user is typically sleeping. Other examples are also possible.

In a further aspect, inter-network bandwidth marketplace 518 may include or have access to an inter-network link database 528. Whenever an offer for an inter-network link is received from a selling-agent module 522A or 522B or directly from a client device 526, inter-network link marketplace 518 may create a record of the offer in inter-network link database 528. The record for a given offer may include data such as: (a) the client device that has offered the inter-network link, (b) the amount of bandwidth offered, (c) pricing information for the bandwidth, (d) location information for the client device, (e) information relating to a particular balloon or balloons and/or to a particular terrestrial-network node or nodes between which the client device is capable of providing an inter-network link, and/or (f) other data relating to the offer. Further, when an offer is selected and the offered bandwidth is being partially or entirely used for an inter-network link, the inter-network link database 528 may be updated to reflect that the offer is no longer available or to reflect a reduced amount of available bandwidth (in the case that only part of the offered bandwidth is selected for use as an inter-network link).

The arrangement shown in FIG. 5B is provided as an example, and is not intended to be limiting. Other arrangements of the illustrated components and/or other components are possible.

VI. Illustrative Methods

A. Purchasing-Agent Methods

Figure 6A:
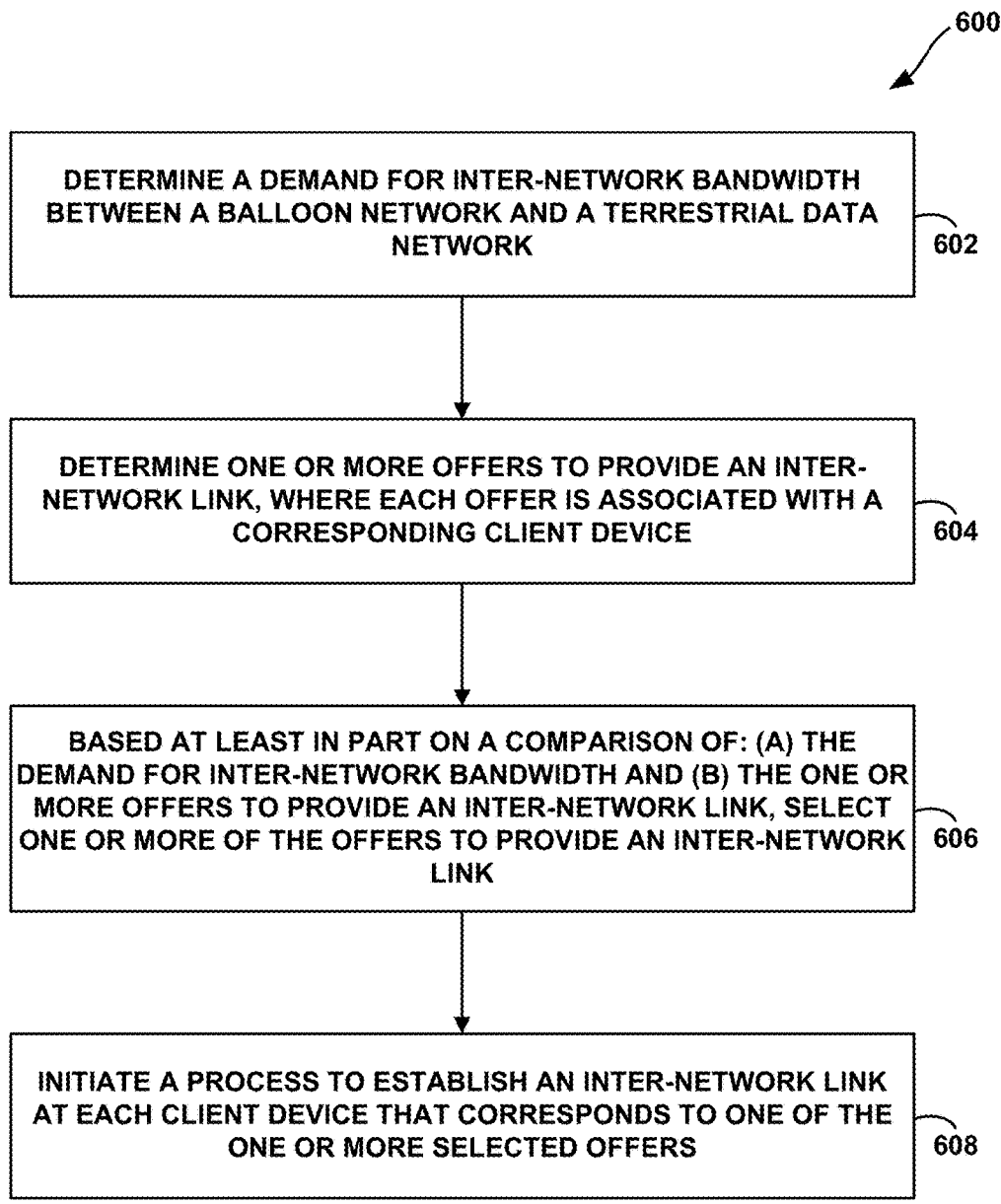
FIGS. 6A and 6B are flow charts illustrating computer-implemented methods, according to example embodiments.

FIG. 6A is a flow chart illustrating a computer-implemented method, according to an example embodiment. Example methods, such as method 600 of FIG. 6A, may be carried out by a computing device that is part of or associated with a marketplace for inter-network bandwidth. For simplicity, method 600 is described as being carried out by a purchasing-agent system. A purchasing-agent system may be any computing device or combination of computing devices that implements purchasing-agent functionality, such as a computing system that implements one of the purchasing agent modules 520A to 520C shown in FIG. 5B, for example.

As shown by block 602 of FIG. 6A, method 600 involves a purchasing-agent system determining a demand for inter-network bandwidth between a balloon network and a terrestrial data network. The purchasing-agent system then determines one or more offers to provide an inter-network link, which may increase the inter-network bandwidth between the balloon network and the terrestrial data network, where each offer is associated with a corresponding client device, as shown by block 604. Then, based at least in part on a comparison of: (a) the demand for inter-network bandwidth and (b) the one or more offers to provide an inter-network link, the purchasing-agent system selects one or more of the offers to provide an inter-network link, as shown by block 606. The purchasing-agent system may then initiate a process to establish an inter-network link at each client device that corresponds to one of the one or more selected offers, as shown by block 608.

In a further aspect, a purchasing-agent system may implement an example method in a reactive manner, in a proactive manner, or in a both reactive and proactive manner. For instance, a purchasing-agent system could reactively implement method 600 in order to reactively detect when a demand for inter-network bandwidth exists due to current usage of a balloon and/or a terrestrial network, and responsively purchase inter-network links to help satisfy the demand. Additionally or alternatively, a purchasing-agent system could proactively detect the expected demand for inter-network bandwidth at some time in the future, and pre-emptively purchase inter-network links to help meet the expected demand.

i. Demand for Inter-Network Bandwidth

At block 602, various techniques may be used to determine the demand for inter-network bandwidth between the balloon network and the terrestrial data network.

In an example embodiment, the demand may be determined numerically by determining an amount of additional bandwidth that is desired and pricing information for the desired bandwidth (i.e., bid pricing). In particular, the amount of bandwidth demand and/or the bid pricing for the bandwidth may be determined based on factors such as: (a) resource utilization via an existing inter-network link, (b) expected change in latency for traffic through the balloon network and/or through the terrestrial data network, (c) expected change in network capacity of the balloon network and/or the terrestrial data network, (d) one or more factors related to the existing or potential offers to provide inter-network links (i.e., client devices that are or could be available to provide inter-network links), and/or (e) factors related to client devices that are currently utilizing or would be expected to utilize inter-network bandwidth, among other possibilities.

In some embodiments, a purchasing-agent system may consider the resource utilization of existing inter-network bandwidth (e.g., between one or more existing inter-network links), and, if utilization is high, determine that more bandwidth is desired. As an example, if more than a threshold percentage of inter-network bandwidth between a given balloon and a given terrestrial-network node is being used, then the purchasing-agent system may determine that one or more inter-network links between the given balloon and the given terrestrial-network node (or to other nearby terrestrial-network nodes) are desirable. Further, the amount of additional bandwidth may be determined based on the percentage of bandwidth currently in use, with the amount being higher, the closer the existing inter-network bandwidth is to being fully utilized. Additionally or alternatively, the amount of additional bandwidth may be determined based on a buffer size or rate the buffer size is increasing at the given balloon or at the given terrestrial-network node, with the desired amount increasing proportionally to the size of the buffer and/or to the rate the buffer size is increasing.

Similarly, pricing information may be determined based on resource utilization of existing inter-network bandwidth. For instance, the price per unit of bandwidth that a network operator is willing to pay may increase as the percentage of existing inter-network bandwidth that is in use increase. Similarly, the price per unit of bandwidth that a network operator is willing to pay may increase proportionally to the size of a buffer and/or to a rate the buffer size is increasing at a given balloon and/or at a given terrestrial-network node.

In some embodiments, a purchasing-agent system may determine an expected change in latency for the balloon network and/or for the terrestrial network, which is expected to result from a certain amount of additional inter-network bandwidth. The purchasing-agent system may then use the expected latency change to help determine how much additional bandwidth is needed or desired, and/or to help determine bid pricing for such additional bandwidth.

At block 702, the function of determining the demand may involve determining pricing information (e.g., bid pricing) for the desired inter-network bandwidth. For example, a purchasing-agent system may determine how much additional bandwidth is worth to the operator of a balloon network and/or to the operator of a terrestrial data network (e.g., how much the respective operator is willing to pay for the additional inter-network bandwidth). A determination of how much additional bandwidth is worth to a network operator may be based on various factors.

In an example embodiment, pricing information may be determined based on some or all of the same factors that are considered in determining the amount of bandwidth that is desired. Further, in some embodiments, the functions of determining the demand for additional inter-network bandwidth and determining bid pricing for the additional inter-network bandwidth may be related.

As a specific example, a purchasing-agent system could determine, based on factors such current resource utilization and/or an expected reduction in latency, that inter-network bandwidth in a certain geographic area (e.g., between a balloon network and one or more terrestrial-network nodes in the geographic area) could be beneficial. Further, based on the magnitude of the benefit that is expected, the purchasing-agent system may determine a value of additional inter-network bandwidth. For example, the purchasing-agent system might determine that every additional 1 MB/sec of bandwidth is worth $0.10 for each minute that it is provided. Many other examples are possible.

In some embodiments, rather than determining that a fixed amount of bandwidth is desired, the purchasing-agent system may determine different bid pricing for multiple "bandwidth-demand levels." Each bandwidth-demand level may correspond to a certain amount of bandwidth demand, and have an associated priority with respect to the other bandwidth-demand levels, with higher-priority levels having higher bid pricing. In an example embodiment, the bid pricing for each bandwidth-demand level may be a bid price per unit of bandwidth. The respective bid price per unit for each bandwidth-demand level may be determined based at least in part on the priority of the respective bandwidth-demand level. More specifically, in an example embodiment, bandwidth-demand levels having a higher priority will be determined to have higher bid pricing.

As a specific example, a purchasing-agent system might determine that every additional 1 MB/sec of bandwidth is worth $0.10 per minute that it is provided, for up to an additional 5 MB/sec of inter-network bandwidth. However, the purchasing-agent system might value the next 5 MB/sec of additional internetwork bandwidth (e.g., bring the total additional bandwidth to between 5 MB/sec to 10 MB/sec) at only $0.05 per minute that it is provided, and value any additional bandwidth bring the total additional bandwidth to more than 10 MB/sec at only $0.01 per minute that it is provided. Many other examples are also possible.

In a further aspect, a purchasing-agent system could consider seller-side factors when determining the bid pricing for additional inter-network bandwidth, such as the number of client devices that are available to serve as an inter-network link in a particular area or between a certain balloon and the terrestrial network (e.g., client devices that are within a certain distance from the balloon and a node of the terrestrial network, such that an inter-network link is possible via each client device). If a number of client devices are all available to provide inter-network links in an area or location where there is demand for inter-network bandwidth, then the purchasing-agent system may consider these client devices to be interchangeable for this purpose. As such, a larger number of devices in an area may be interpreted as a larger supply of potential inter-network bandwidth. Therefore, the purchasing-agent system may reduce the bid price for additional inter-network bandwidth as the number client devices available to provide inter-network links increases.

When a purchasing-agent system relies on the latency change that is expected to result from adding an inter-network, the expected latency change may be determined in various ways. For example, a network could send a number of "ping" messages to test bandwidth and latency. Further, a client device may be configured so as to allow ping messages to be sent between a balloon network and a terrestrial data network, via the client device, before an inter-network link is established. As such, the measurements provided by the ping messages may be used to compare the latency with and without an internetwork link via the client device. Further, as the topology of the balloon network and the available client devices changes dynamically, a marketplace system could experimentally add or subtract new inter-network links in order to test the incremental bandwidth and/or latency gains or losses that result. Purchasing-agent systems could then add an inter-network link via a client device if the value of the additional bandwidth and/or reduced latency is determined to be higher than a threshold value (and possibly also higher than other available inter-network links).

Further, a purchasing-agent system could use data from recently-added inter-network links to determine the value of adding additional inter-network links. For example, a purchasing-agent system could evaluate the first derivative of the value production that has resulted from recently added inter-network links in a given area, to estimate the value of adding additional inter-network links. (This dynamic process could happen in parallel in many areas across the balloon-network, since the value of adding an inter-network link in one place could be very different than in another place). In this way, the adding (or removing) of inter-network links could be implemented as more of a control systems process, rather than a routing process (as the balloon network may itself be an ad-hoc network).

The above-described techniques for determining the demand for inter-network bandwidth between the balloon network and the terrestrial data network are provided as examples. It should be understood that other techniques are possible.

ii. Determining Client-Device Offers

At block 604, the function of the purchasing-agent system determining one or more offers to provide an inter-network link may simply involve the purchasing-agent system receiving or acquiring a list of offers that have been made by client devices and/or made by selling-agent modules on behalf of client devices. For instance, a given purchasing-agent module 520A to 520C may search inter-network link database 528 for offers to provide inter-network links. Alternatively, a separate system or component of inter-network marketplace 518 may search for offers on behalf of a purchasing-agent module 520A to 520C.

Further, a given offer may include: (a) identification information for the client device that is offering inter-network bandwidth via an inter-network link, (b) an indication of the amount of inter-network bandwidth that is being offered via the inter-network link, and (c) pricing information for the available bandwidth (e.g., offer pricing), (d) location information for the client device at which the inter-network link is being offered, (e.g., GPS coordinates of the client device), and/or (e) other data relating to the offer.

In some embodiments, the pricing information for a given offer may include a price for a certain amount bandwidth for a certain amount of time. For example, an offer might indicate that a client device would provide an inter-network link with 100 kB/sec for ten minutes, for a certain fixed price. Other examples are also possible.

Pricing information for a given offer might also include a price per unit of data that the client device desires for traffic over the inter-network link. For example, an offer might indicate that a client device would provide an inter-network link in exchange for $1.00 per GB of data that is sent over the link. In such an embodiment, the offer might also indicate a bandwidth cap for the inter-network link; 100kB/sec, for instance. Such an offer also might indicate a timeframe that the inter-network link could be provided (e.g., for the next ten minutes or for the next hour).

In a further aspect, a given offer to provide an inter-network link may indicate one or more restrictions on the use of the inter-network link. For example, an offer might indicate certain restrictions on the type of data traffic that can be sent via the link. For example, an offer might indicate that if the offer is accepted and an internetwork link is established via the client device, certain undesired content cannot be sent via the internetwork link. Other restrictions on the use of an internetwork link are also possible.

iii. Selecting Offers for Inter-network Link

As noted, block 606 of method 600 may involve a purchasing-agent system selecting one or more of the offers to provide an inter-network link. In an example embodiment, the selection may be based on a comparison of the demand for inter-network bandwidth, as determined at block 602, and the one or more offers to provide an inter-network link, as determined at block 604. More specifically, the purchasing-agent system may compare the bid pricing for additional inter-network bandwidth to offer pricing indicated by one or more offers to provide inter-network links.

In some embodiments, the purchasing-agent system may attempt to select offers so as to both meet a specific need for additional inter-network bandwidth and meet certain price requirements. For example, the purchasing-agent system may attempt to select offers that (a) collectively have available bandwidth to provide a determined amount of inter-network bandwidth and (b) have collective offer pricing that meets the bid-selection pricing requirements.

To illustrate, a purchasing-agent system may determine that an additional 5 MB/sec of inter-network bandwidth is desired between one or more terrestrial-network nodes in a given geographic area and a balloon network, and that the maximum price rate to be paid is $0.10 per minute for each MB/sec of bandwidth. Accordingly, the purchasing-agent system may search for offers from remote devices that are located such that they can provide an inter-network link between the terrestrial-network nodes in a given geographic area and the balloon network. The purchasing-agent system may then select offers at $0.10 per minute per MB/sec of bandwidth, or less, that will provide inter-network links having 5 MB/sec of bandwidth in total.

In some embodiments, the purchasing-agent system may not have a set amount of additional bandwidth that it needs to acquire. For instance, at block 602, the purchasing-agent system may determine that, for an upcoming thirty-minute period of time, up to 500 kB/sec of additional inter-network bandwidth is desirable between a balloon network and terrestrial-network nodes in a certain geographic area. Further, the purchasing-agent system may determine that every additional 1 kB/sec of bandwidth, up to the 500 kB/sec in total, is worth $0.0002 per minute during that thirty-minute period of time. Accordingly, the purchasing-agent system may search for offers to provide inter-network links in the geographic area having offer pricing that is less than or equal to $0.0002 per minute that 1 KB/sec of bandwidth is provided by the corresponding client device. In this scenario, the purchasing-agent system may or may not find offers for the full 500 kB/sec of inter-network links. For example, the purchasing-agent system might find three offers for 100 kB/sec at $0.0002 per minute or less. In this case, the purchasing-agent system may select just these three offers, for 300 kB/sec of additional inter-network bandwidth. Other examples are also possible.

As noted above, in some embodiments a purchasing-agent system may determine multiple bandwidth-demand levels for inter-network bandwidth. In such embodiments, the purchasing-agent system may search for offers according to the multiple bandwidth-demand levels, selecting offers to meet the higher-priority demand levels (for which the purchasing-agent system is typically willing to pay a higher price) first.

In a further aspect, bids from purchasing-agent systems and/or offers from my client devices may include certain required or desired latency and/or priority parameters. For example, a purchasing-agent system might be generally willing to pay $0.01 per mbps of inter-network bandwidth, but might bid more (e.g. $0.02 per mbps) if a client device commits to a resend latency of no more than five milliseconds for an inter-network link. Similarly, a purchasing-agent system might be willing to pay more for a commitment from a client device to run balloon-to-backbone routing software at the client device's highest priority setting. As another example, a purchasing-agent system might be willing to pay different rates for uplink data and downlink bandwidth over an inter-network link. Other examples are also possible.

For instance, in some embodiments, a purchasing-agent system for a balloon network may bid on inter-network bandwidth so as to spread the risk of service loss over a number of inter-network links. As such, the purchasing-agent system may prefer to use as many ground-based Internet Service Providers (ISPs) as feasible. As such, the purchasing agent system may be configured to pay more or less to client devices that connect via certain ISPs so as to achieve such a balance of use between the ISPs. Similarly, the operator of a balloon network might have an agreement with a certain ISP or ISPs, and therefore be willing to pay more for inter-network links via client devices that are with one of the ISPs that the balloon-network operator has an agreement with.

The above-described techniques for selecting offers to meet the need or desire for additional inter-network bandwidth are provided as examples. It should be understood that other techniques are possible.

iv. Initiating the Process to Establish Internetwork Links

As indicated by block 608 of method 600, a purchasing-agent system may also initiate a process to establish an inter-network link via the client device or client devices that correspond to the selected offer or offers. Various types of processes are possible, depending upon the implementation. Further, for purposes of explanation herein, a client device corresponding to one of the selected offers may be referred to as a selected client device.

In an example embodiment, a purchasing-agent system may initiate a process in which a message is sent to each selected client device that indicates that their offer to provide an inter-network link has been accepted. The message may indicate the bandwidth that should be provided by the selected client device for the inter-network link, the particular balloon and the particular terrestrial-network node between which the client device should provide an inter-network link, the time at which the client device should make the inter-network link available, the time at which the client device can tear down the inter-network link, and/or other information.

v. Alternative Implementations

Figure 6B:
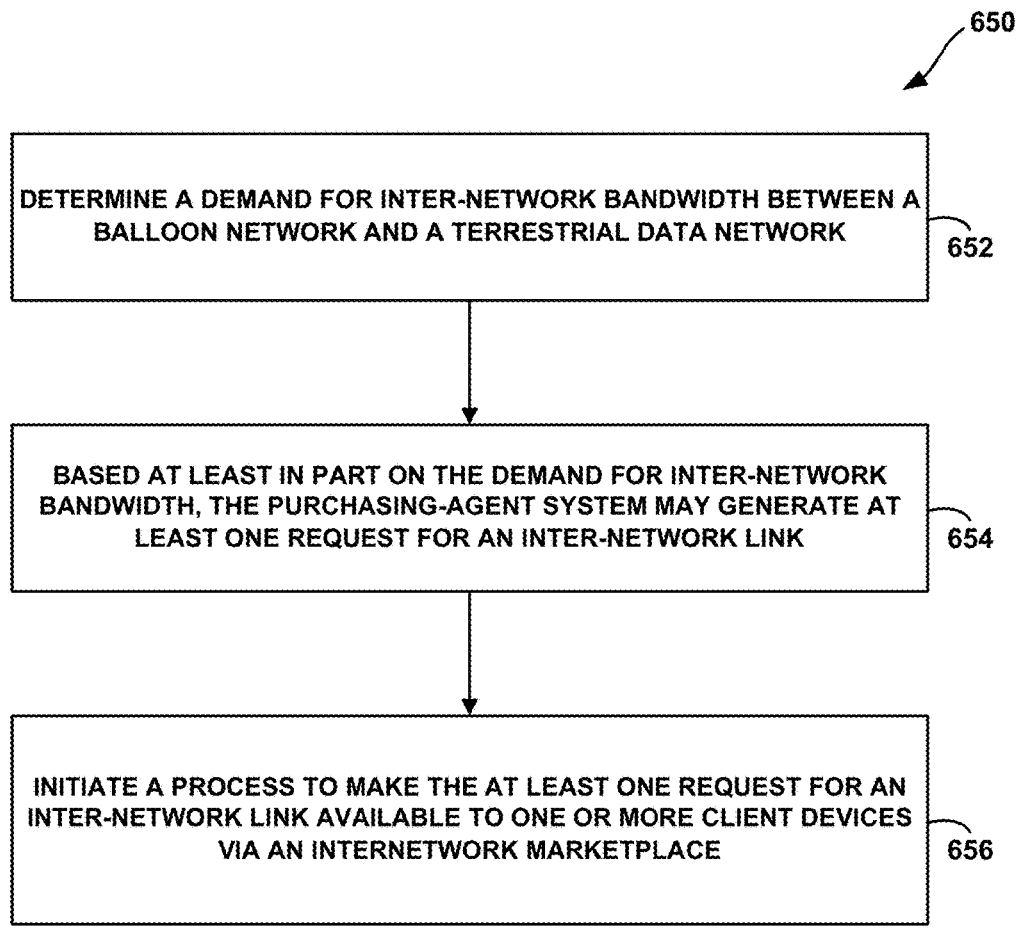

In some embodiments, a purchasing-agent system may actively solicit offers for inter-network links. For example, FIG. 6B is a flow chart illustrating a computer-implemented method 650, according to an example embodiment. For simplicity, method 650 is described as being carried out by a purchasing-agent system.

As shown by block 652 of FIG. 6B, method 650 involves a purchasing-agent system determining a demand for inter-network bandwidth between a balloon network and a terrestrial data network. Then, based at least in part on the demand for inter-network bandwidth, the purchasing-agent system may generate at least one request for an inter-network link, as shown by block 654. The purchasing-agent system may then initiate a process to make the at least one request for an inter-network link available to one or more client devices via an internetwork marketplace, as shown by block 656. The purchasing-agent system may do so by adding the request to a database that is accessible to client devices and/or by actively sending a request message to the client devices.

The purchasing-agent system may receive one or more offers to provide an inter-network link in response to a request for an inter-network link. Each received offer may be associated with a corresponding client device. Accordingly, the purchasing-agent system can then proceed to select one or more offers and establish inter-network links in a similar manner as described with respect to method 600.

Methods 600 and 650 are described above as being carried out by a purchasing-agent system. When there is little or no competition between purchasers of inter-network bandwidth, such an arrangement may be more desirable. More specifically, if there are only a few or even just one network operator or service provider trying to purchase inter-network bandwidth, then it may be desirable for the purchasing-agent system to match up bid pricing, which is determined by the purchasing agent system, and offer pricing, which is indicated by selling-agent modules and/or client devices, and then initiate transactions for the inter-network bandwidth.

However, in some embodiments, a separate system or systems within a marketplace for inter-network bandwidth may implement some or all of the functions of methods 600 and 650 that are described above as being carried out by a purchasing-agent system. For example, if there are a number of purchasing-agent modules acting on behalf of a number of different service providers and/or network operators, which are all bidding for inter-network bandwidth in the same geographic area, then the purchasing-agent modules may simply determine offer pricing and send offers to a marketplace system. The marketplace system may then match bid pricing from the purchasing-agent modules to offer pricing from selling-agent modules and/or client devices, and initiate transactions for inter-network link. Other implementations are also possible.

B. Selling Agent or Client-Device Method

Figure 7:
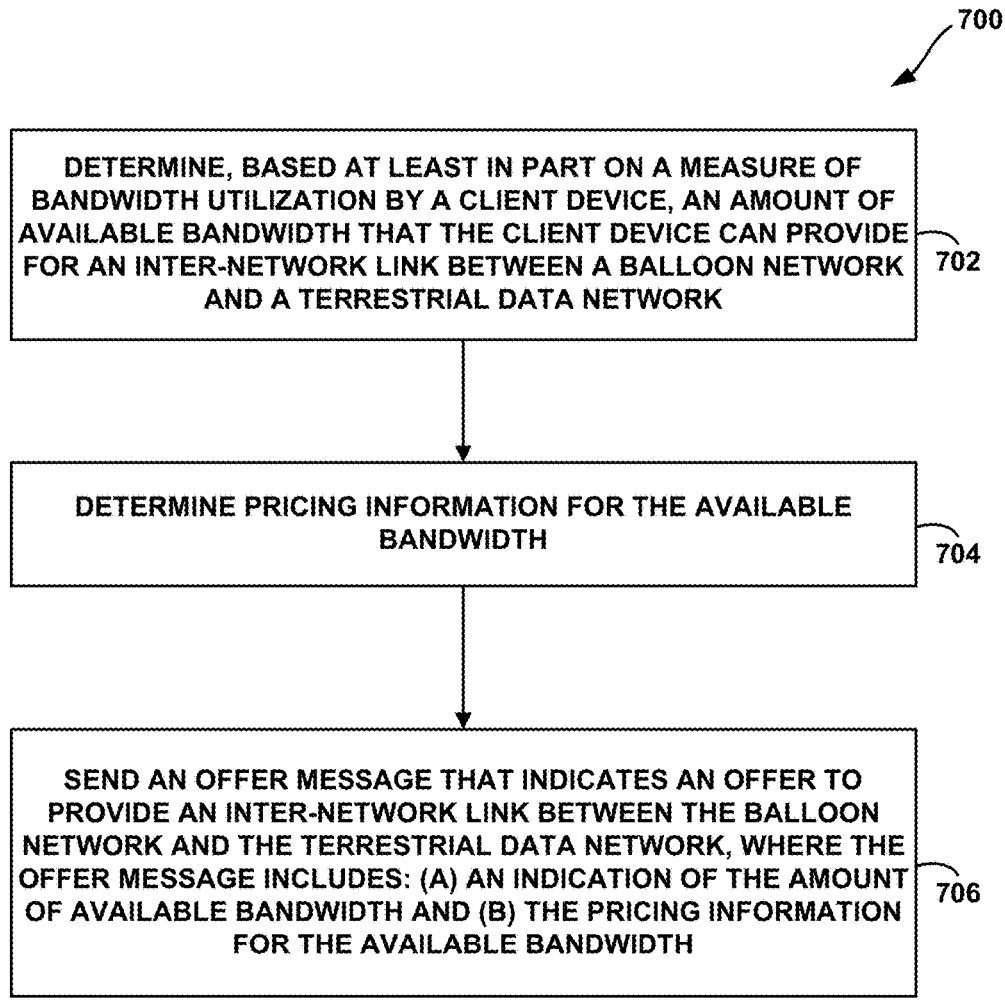
FIG. 7 is a flow chart illustrating a computer-implemented method, according to an example embodiment.

FIG. 7 is a flow chart illustrating a computer-implemented method, according to an example embodiment. Example methods, such as method 700 of FIG. 7, may be carried out by a computing device that implements a selling-agent module, in order to determine when to make an offer for an inter-network link via a certain client device and/or offer pricing for such an offer. For simplicity, method 700 is described as being carried out by a client system. The client system that carries out method 700 may be, for example, a client device that implements a selling-agent module or a remote system that implements a selling-agent module on behalf of a client device. Other types of computing devices or combination of computing devices may also carry out method 700, without departing from the scope of the invention.

Method 700 involves a client system determining, based at least in part on a measure of bandwidth utilization by a client device, an amount of available bandwidth that the client device can provide for an inter-network link between a balloon network and a terrestrial data network, as shown by block 702. The client system then determines pricing information for the available bandwidth (i.e., offer pricing), as shown by block 704. The client system then sends an offer message that indicates an offer to provide an inter-network link between the balloon network and the terrestrial data network, where the offer message includes: (a) an indication of the amount of available bandwidth and (b) the pricing information for the available bandwidth, as shown by block 706. In an illustrative arrangement, the client system block 706 may involve the client system making the offer available in a marketplace for inter-network bandwidth, such as marketplace 518 shown in FIGS. 5A and 5B.

VII. Example Scenarios

Figure 8A:
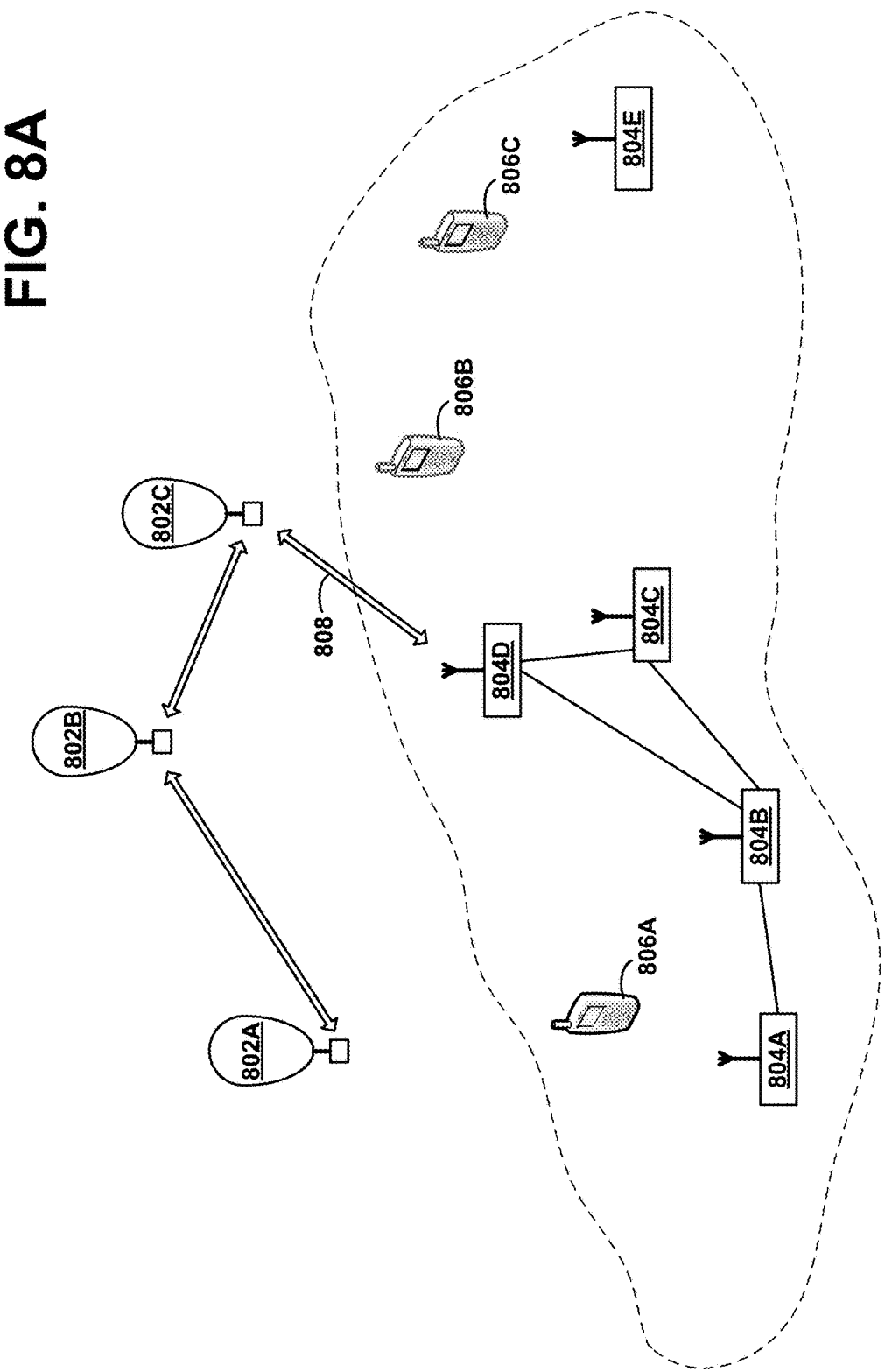

FIGS. 8A and 8B are simplified illustrations of scenarios in which method 600 and/or method 800 may be implemented. In the scenario 800 shown in FIG. 8A, balloons 802A to 802C are operating over a geographic area 801. Further, terrestrial-network nodes 804A to 804E and client devices 806A to 806C are located in the geographic area 801.

Terrestrial-network nodes 804A to 804E are configured to operate as nodes of a terrestrial data network. The terrestrial-network nodes 804A to 804E may all be of the same type or may be of different types. Each node 804A to 804E may be a ground-based station, such as a gateway or access point, for example. Terrestrial-network nodes 804A to 804E may take other forms as well.

Client devices 806A to 806C may take various forms. For example, each client device 806A to 806C may be a personal computer, a laptop computer, a tablet computer, a mobile phone, a wearable computer, or any other device that is capable of providing an inter-network link. Further, client devices 806A to 806C may all be of the same type or may be of different types.

In some instances, the purchasing-agent system may determine the demand for internetwork bandwidth between a particular balloon in the balloon network and the terrestrial data network. For example, a link 808 may between balloon 802C and terrestrial-network node 804D may provide a certain amount of inter-network bandwidth. However, for various reasons, it may be determined that more inter-network bandwidth is desired between balloon 802C and terrestrial-network node 804D. The purchasing-agent system may then determine a particular amount of additional bandwidth that is desired between balloon 802C and terrestrial-network node 804D. The purchasing-agent system may also determine pricing information for the desired amount of additional bandwidth. For example, the purchasing-agent system may determine a total dollar amount for certain amount of bandwidth or a dollar amount per unit of bandwidth.

In other instances, the purchasing-agent system may determine a demand for additional bandwidth between the balloon network and a particular node in the terrestrial data network. For example, terrestrial-network node 804E may be too far from any balloon to connect directly. As such, a purchasing-agent system may search offers to provide inter-network links, including an offer from client device 806C, and determine that client device 806C is located such that it could provide an internetwork link between balloon 802C and terrestrial-network node 804E. The purchasing-agent system may also determine how much inter-network bandwidth is desired between balloon 802C and terrestrial-network node 804E and pricing information, such as bid pricing reflecting how much the desired bandwidth is worth to the operator of the balloon network. Then, if the offer pricing from client device 806C is less than or equal to the bid pricing, the purchasing-agent system may initiate a process to establish an inter-network link 810 via client device 806C, as shown in FIG. 8B. Further, if inter-network link 810 does not provide as much bandwidth as desired, the purchasing-agent system may also initiate a process to establish an inter-network link 811 via client device 806B.

In some instances, a purchasing-agent system may determine the demand for inter-network bandwidth for a certain geographic area. For instance, there may be an area where a bottleneck is preventing terrestrial access points from providing as much bandwidth as they otherwise could. In this scenario, in the purchasing-agent system may determine that additional inter-network links between the terrestrial network in the area and the balloon network could provide inter-network bandwidth to at least partially overcome the bottleneck, so that the terrestrial access points can increase the available bandwidth in the geographic area.

For example, there may be a bottleneck at terrestrial-network node 804C, where a large amount of data is being routed to terrestrial-network node 804E via terrestrial-network node 804D. If terrestrial-network node 804E is receiving data to be routed to 804E at a rate that is greater than the bandwidth of link 812, then terrestrial-network node 804D may begin to build a buffer of data to send to terrestrial-network node 804E. The build-up of buffered data may be detected and a purchasing-agent system may responsively determine that there is a demand for inter-network links to provide a route through the balloon network to terrestrial-network node 804E. To meet the demand, the purchasing-agent system may purchase one or more inter-network links, such as the inter-network links 810 and 811 shown in FIG. 8B. Other examples are also possible.

VIII. Operation of an Inter-Network Link

The following section provides examples of how a client device may operate as an inter-network link, e.g., once the client device has been selected to provide an inter-network link via an example method, method such as method 600. The following section also provides examples of how an accounting system may credit accounts for client devices when they provide an inter-network link.

Figure 9:
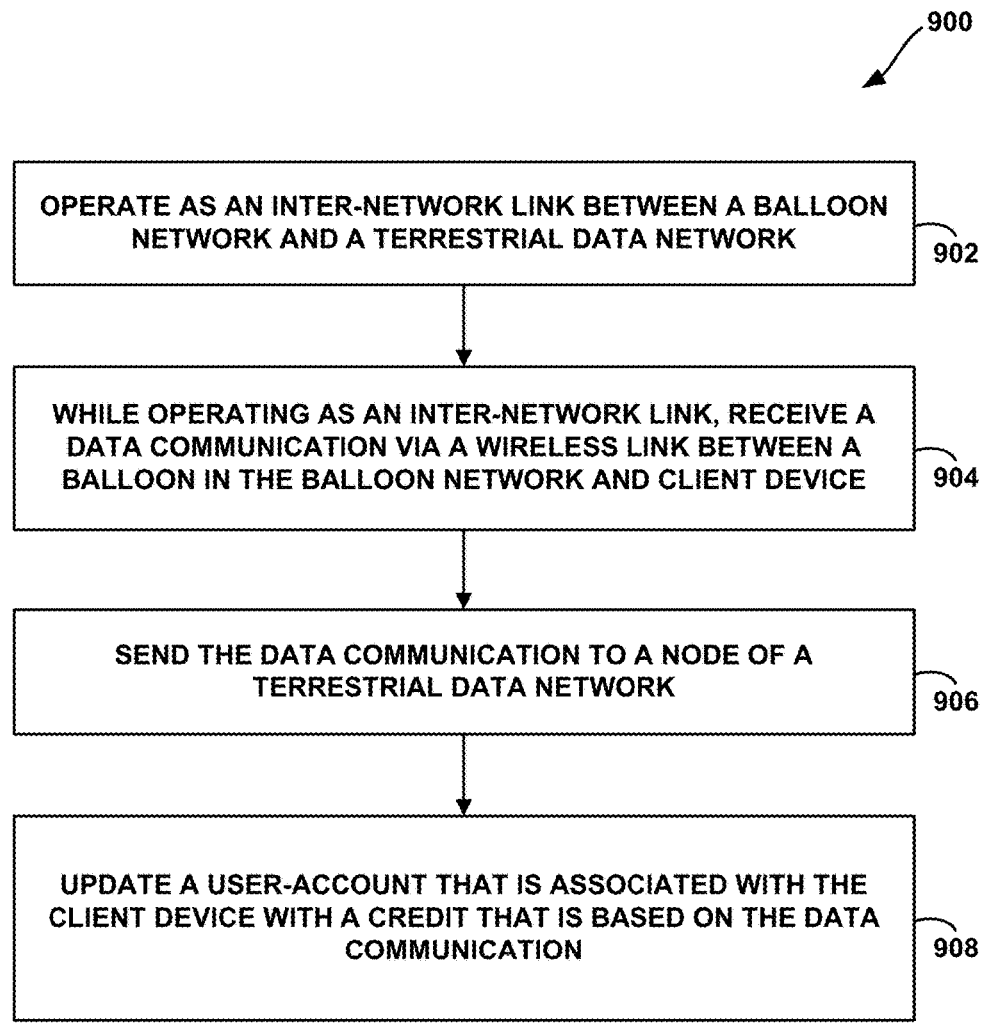
FIG. 9 is a flow chart illustrating a computer-implemented method, according to an example embodiment.

FIG. 9 is a flow chart illustrating a computer-implemented method 900, according to an example embodiment. Method 900 may be carried out by a client device and/or by components of a client device. As a specific example, method 900 could be implemented by the client device 500 shown in FIG. 5, in order to function as an inter-network link between balloon network 502 and Internet 504. Further, a client device or a component thereof may include program instructions stored on a non-transitory computer readable medium and a processor that executes the instructions. However, a client device may take other forms including software, hardware, and/or firmware.

As shown by block 902, method 900 involves a first client device operating as an inter-network link between a balloon network and a terrestrial data network. While the first client device is operating as an inter-network link, the first client device may receive a data communication via a wireless link between a balloon in the balloon network and the first client device, as shown by block 904. The first client device then sends the data communication to a node of a terrestrial data network (which is different from the balloon network), as shown by block 906.

In a further aspect, an example method may facilitate a user receiving credit for sharing their device's bandwidth and providing an inter-network link. To do so, when the first client device sends data to the terrestrial data network at block 906, the first client device may also update the associated the user-account with a credit that is based on the data communication, as shown by block 908. For example, the client device may send a credit-request message to an accounting system such that a user-account that is associated with the device is updated with the credit. Alternatively, the user-account may be updated with the credit automatically by, for example, accessing data records for the device that indicate the device provided an inter-network link and issuing a corresponding credit. Other techniques for issuing a credit to a user-account are also possible.

In an example method, the intended recipient of the data communication is a second client device that is different from the first client device. For example, method 900 could be implemented by the client device 500 shown in FIG. 5A, in order to function as an inter-network link by receiving data communications from balloon 510A that are directed to any of client devices 508A, 508B, or 508, and forward the data communication to access point 506 so that the data communications can be routed to the appropriate client device via Internet 504 (or directly to a client device such as client device 508A, which is connected to the access point 506).

In a further aspect, to provide an inter-network link, an example method may involve a client device receiving a data communication via a link between a node of the terrestrial data network, and sending the data communication to a balloon in the balloon network. For example, client device 500 may function as an inter-network link by receiving data communications via access point 506, which may originate from any of client devices 508A, 508B, or 508C, and sending the data communications to balloon 510A so that so that the data communications can be routed to the appropriate client device (e.g., client device 508D) via balloon network 502.

An example method 500 may further involve optional functionality in which a client device makes itself available as an inter-network link or make itself unavailable as an inter-network link. More specifically, method 900 may initially involve the first client device receiving an indication that it should be configured as a link between the balloon network and the terrestrial data network, and responsively configuring itself to perform the functions of method 900. Such functionality may be controllable by a user via an application that runs on a client device.

As an example, a mobile phone or a laptop computer might include an application via which a user can turn inter-network link functionality on or off. Such an application could also allow for more complex control over inter-network functionality of the client device. For example, such an application might allow the user to adjust view the amount of the bandwidth from their device's connection to the balloon network that is available for inter-network data transfer.

Further, a client device may analyze its connection to a balloon network, and then provide information about the connection to help a user decide whether and/or how to set up an inter-network link via their device. For instance, a client device could measure current bandwidth, historical bandwidth, and/or predicted bandwidth over its link to a balloon network, and display this information to the user via an application. The client device could also determine the device's current, historical, and/or predicted use of bandwidth for the device's for own communications via its balloon-network connection. The user could then make a decision to set up an inter-network link via their device and/or determine how much of their bandwidth to make available for an inter-network link based on the total bandwidth that is available over the device's connection to the balloon network and/or the amount of bandwidth required or desired for the user's own data communications via the device.

In some embodiments, a client device may be configured to dynamically and intelligently adjust the amount of bandwidth provided for an inter-network link. For example, a client device could update the amount or percentage of the bandwidth over its connection to a balloon network based on bandwidth that is currently in use or is desirable for the device's own data communications via the balloon, and/or based on user-defined preferences for allocating bandwidth to an inter-network link. Other examples are also possible.

Further, a client device may use different techniques to relay data between a balloon network and a terrestrial data network, depending upon the particular implementation. For example, a client device may be configured to operate as a repeater, a router, or a bridge between the balloon network and the terrestrial data network. Other examples are also possible.

In a further aspect of an example method, a client device may notify an entity or entities that make routing decisions when the client device is providing an inter-network link, and/or may otherwise announce the device's availability to provide an inter-network link for data traffic between a balloon network and terrestrial data network. For example, a client device may send a credit-request message to an accounting system. Alternatively, a client device might register a network address being used for the inter-network link with an accounting system or another entity, which can then monitor traffic via the inter-network link so that appropriate credit can be given. In either case, a user-account that is associated with the client device may then be credited according to the amount or percentage of the client device's network resources that are made available and/or utilized to provide an inter-network link between a balloon network and a terrestrial data network.

Herein, it should be understood that a "credit-request message" may be any kind of electronic communication relating to a client device providing an inter-network link between a balloon network and a terrestrial data network. For example, a client device may simply notify an accounting system when it is operating so as to provide an inter-network link (e.g., providing a start time and a stop time, or the total time for which it provided an inter-network link).

Additionally or alternatively, a credit-request message could indicate an amount of data transferred, a data rate over the inter-network link, and/or a percentage of the client device's bandwidth that dedicated to and/or utilized for an inter-network link. Further, a credit-request message may include a unique identifier for the client device, which may be used to look up the corresponding user-account, and/or may include a unique identifier for the corresponding user account (e.g., an account number and/or a user-name and password). Other types of information may also be included in a credit-request message.

IX. Accounting for Inter-Network Links

As noted above, a client device may send one or more credit-request messages to an accounting system such that an associated user-account is updated with credit that is based on data communications via an inter-network link provided by the client device (e.g., based on the device's network resources that are made available and/or utilized to relay communications between a balloon network and a terrestrial data network). Thus, in a further aspect, an accounting system may implement methods to credit user-accounts according to inter-network link functionality provided via the corresponding client devices.

Figure 10:
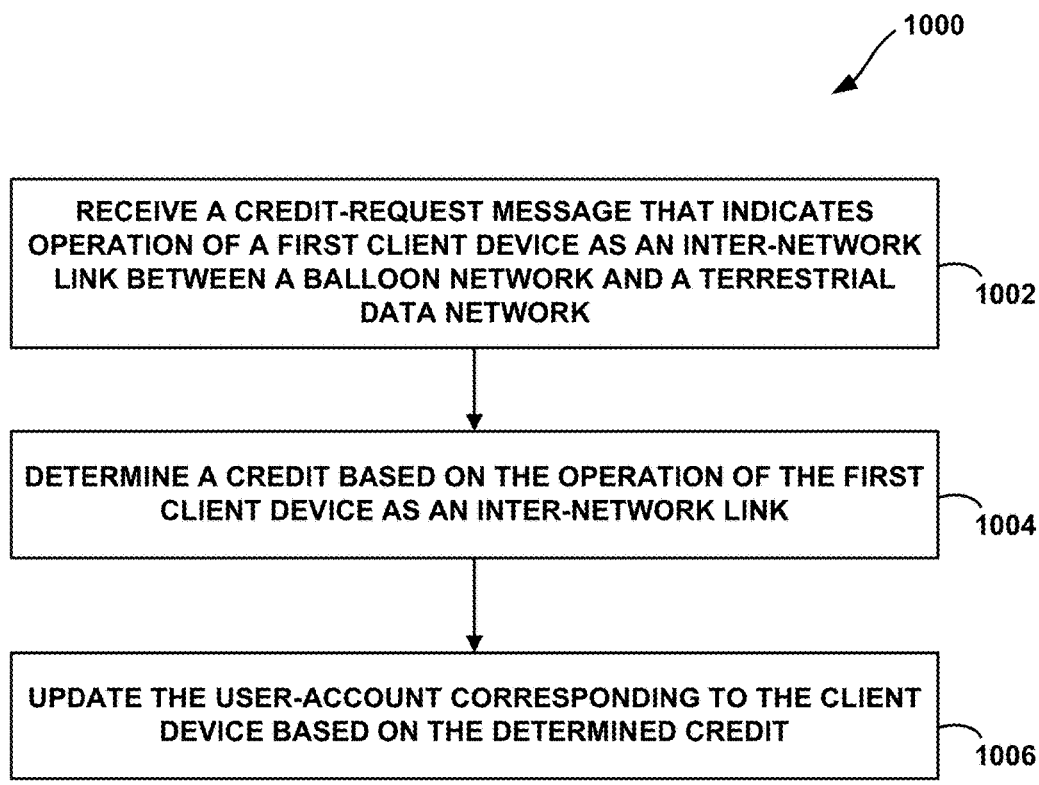
FIG. 10 is a flow chart illustrating a computer-implemented accounting method, according to an exemplary embodiment.

FIG. 10 is a flow chart illustrating a computer-implemented accounting method 1000, according to an exemplary embodiment. Example methods, such as method 1000, may be carried out by an accounting system, which may be implemented by one or more computing devices, or by components of such an accounting system. As a specific example, method 1000 could be implemented by the accounting system 516 shown in FIG. 5A, in order to credit a user-account that is associated with client device 500, when client device 500 provides an inter-network link between balloon network 502 and Internet 504. However, an accounting system may take other forms including software, hardware, and/or firmware.

As shown by block 1002, method 1000 involves an accounting system receiving a credit-request message that indicates operation of a first client device as an inter-network link between a balloon network and a terrestrial data network. In response to the credit-request message, the accounting system may determine a credit based on the operation of the first client device as an inter-network link, as shown by block 1004. Then, accounting system may then update the user-account corresponding to the client device based on the determined credit, as shown by block 1006.

X. Conclusion

The above detailed description describes various features and functions of the disclosed systems, devices, and methods with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A computer-implemented method comprising:
  establishing, by a first client device, an inter-network link between an aerial telecommunications network and a terrestrial data network via the first client device, wherein the aerial telecommunications network comprises a plurality of aerial vehicles configured to operate as nodes of the aerial network, wherein the aerial telecommunications network is a separate network from the terrestrial data network, and wherein the inter-network link comprises both a wireless link between the first client device and the aerial telecommunications network and a second link between the first client device and the terrestrial data network;
  while the first client device is operating as the inter-network link:
    receiving, by the first client device, first data via the wireless link between the aerial telecommunications network and the first client device, wherein a user-account is associated with the first client device, and wherein an intended recipient of the first data is a second client device that is different from the first client device; and
    determining that the first data was sent to the first client device in its role as the inter-network link and responsively relaying, by the first client device, the received first data to a node of the terrestrial data network via the second link.

2. The method of claim 1, further comprising:
  initially receiving an indication that the first client device should be configured as an inter-network link between the aerial telecommunications network and the terrestrial data network; and
  in response to the indication, configuring the first client device to perform the method of claim 1.

3. The method of claim 2, wherein configuring the first client device to perform the method of claim 1 comprises establishing a dedicated communication channel on the wireless link between the first client device and the aerial telecommunications network, which is different from a communication channel between the first client device and the aerial telecommunications network for the communications directed to or originating from the first client device.

4. The method of claim 2, further comprising sending a notification message that indicates that the first client device is configured as a link between the aerial telecommunications network with the terrestrial data network.

5. The method of claim 1, further comprising, while the first client device is operating as the inter-network link, the first client device:
  receiving second data via a second wireless link between the node of the terrestrial data network; and
  sending the second data via the wireless link to the aerial telecommunications network.

6. The method of claim 1, wherein the inter-network link comprises both a long term evolution (LTE) link between the first client device and the aerial telecommunication network and a WiFi link between the first client device and the node of the terrestrial data network.

7. The method of claim 1, further comprising initiating a process to update the associated user-account with a credit, wherein the credit is based on relay of the first data via the inter-network link.

8. The method of claim 7, wherein initiating the process to update the associated user-account with the credit comprises sending a credit-request message to an accounting system such that the associated user-account is updated with a credit, wherein the credit is based on the first data.

9. The method of claim 1, further comprising:
  receiving second data via the wireless link between the first client device and the aerial telecommunications network; and determining that the second data is directed to the first client device, and responsively processing the second data at the first client device.

10. A client device comprising:

a non-transitory computer readable medium; and program instructions stored on the non-transitory computer readable medium and executable by at least one processor to cause the client device to:

operate as an inter-network link between an aerial telecommunications network and a terrestrial data network, wherein the aerial telecommunications network comprises a plurality of aerial vehicles configured to operate as nodes of the aerial network, wherein the aerial telecommunications network is a separate network from the terrestrial data network, and wherein the inter-network link comprises both a wireless link between the client device and the aerial telecommunications network and a second link between the client device and the terrestrial data network; and while operating as the an inter-network link:

receive first data via the wireless link between the aerial telecommunications network and the client device, wherein a user-account is associated with the client device, and wherein an intended recipient of the first data is a second client device that is different from the first client device; and determine that the first data was sent to the client device in its role as the inter-network link and responsively relay the first data to a node of a terrestrial data network via the second link.

11. The client device of claim 10, further comprising program instructions stored on the non-transitory computer readable medium and executable by at least one processor to cause the client device to operate as a router in order to provide the inter-network link.

12. The client device of claim 10, further comprising program instructions stored on the non-transitory computer readable medium and executable by at least one processor to cause the client device to operate as a gateway in order to provide the inter-network link.

13. The client device of claim 10, further comprising program instructions stored on the non-transitory computer readable medium and executable by at least one processor to cause the first client device to operate as a repeater in order to provide the inter-network link.

14. The client device of claim 10, further comprising program instructions stored on the non-transitory computer readable medium and executable by at least one processor to apply protocol mapping to convert the received first data from a protocol associated with the aerial telecommunications network to a protocol associated with the terrestrial data network.

15. The client device of claim 10, further comprising program instructions stored on the non-transitory computer readable medium and executable by at least one processor to initiate an update of the associated user-account with a credit, wherein the credit is based on the data communication.

16. A computer-implemented method comprising:

receiving, by a computing device, a credit-request message that indicates operation of a first client device as an inter-network link between an aerial telecommunications network and a terrestrial data network, wherein the aerial telecommunications network comprises a plurality of aerial vehicles configured to operate as nodes of the aerial network, wherein the first client device is associated with a user-account, wherein the aerial telecommunications network is a separate network from the terrestrial data network, and wherein the inter-network link comprises both a wireless link between the client device and the aerial telecommunications network and a second link between the client device and the terrestrial data network;

in response to the credit-request message, determining, by the computing device, a credit based on the operation of the first client device as an inter-network link between the aerial telecommunications network and the terrestrial data network; and updating, by the computing device, the user-account based on the determined credit;

wherein the operation of the first client device as an inter-network link comprises at least: (a) receipt of first data, by the first client device, via the wireless link between the aerial telecommunications network and the first client device, wherein an intended recipient of the first data is a second client device that is different from the first client device, and (b) a determination that the first data was sent to the first client device in its role as the inter-network link and a responsive transmission of the first data, by the first client device, to a node of a terrestrial data network.

17. The method of claim 16, wherein determining the credit comprises determining the credit based on an amount of data that is transmitted via the inter-network link between the aerial telecommunications network and the terrestrial data network.

18. The method of claim 16, wherein determining the credit comprises determining the credit based on an amount of time for which the first client device operated as an inter-network link between the aerial telecommunications network and the terrestrial data network.

19. The method of claim 16, wherein the determined credit is a monetary amount.

20. The method of claim 16, wherein the determined credit is a non-monetary credit.

* * * * *